US009128607B2

(12) United States Patent
Hosono et al.

(10) Patent No.: US 9,128,607 B2
(45) Date of Patent: Sep. 8, 2015

(54) USER INTERFACE PROVIDED WITH DISPLAY UNIT FOR DISPLAYING SCREEN

(71) Applicants: Masao Hosono, Toyokawa (JP); Yoichi Kurumasa, Toyokawa (JP); Kenichi Komaba, Toyokawa (JP); Takuya Okada, Toyokawa (JP); Tetsuya Tokumoto, Toyokawa (JP); Kazuhiro Tomiyasu, Toyokawa (JP)

(72) Inventors: Masao Hosono, Toyokawa (JP); Yoichi Kurumasa, Toyokawa (JP); Kenichi Komaba, Toyokawa (JP); Takuya Okada, Toyokawa (JP); Tetsuya Tokumoto, Toyokawa (JP); Kazuhiro Tomiyasu, Toyokawa (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 159 days.

(21) Appl. No.: 13/659,272

(22) Filed: Oct. 24, 2012

(65) Prior Publication Data

US 2013/0106749 A1    May 2, 2013

(30) Foreign Application Priority Data

Oct. 26, 2011  (JP) ................. 2011-235403

(51) Int. Cl.
| | | |
|---|---|---|
| G06F 3/041 | (2006.01) | |
| G06F 3/048 | (2013.01) | |
| G06F 3/0488 | (2013.01) | |
| H04N 1/00 | (2006.01) | |
| H04N 1/32 | (2006.01) | |
| G06F 9/44 | (2006.01) | |

(52) U.S. Cl.
CPC .......... *G06F 3/04883* (2013.01); *G06F 9/4443* (2013.01); *H04N 1/00411* (2013.01); *H04N 1/00477* (2013.01); *H04N 1/00482* (2013.01); *H04N 1/32625* (2013.01); *H04N 1/32657* (2013.01); *H04N 1/00453* (2013.01); *H04N 1/00474* (2013.01); *H04N 1/3263* (2013.01); *H04N 1/32635* (2013.01); *H04N 1/32641* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2010/0261505 | A1* | 10/2010 | Yeh et al. .................. | 455/564 |
| 2010/0302281 | A1* | 12/2010 | Kim ............................. | 345/661 |
| 2011/0199312 | A1 | 8/2011 | Okuta | |
| 2011/0242024 | A1 | 10/2011 | Fukumoto et al. | |

FOREIGN PATENT DOCUMENTS

| | | |
|---|---|---|
| CN | 102209169 A | 10/2011 |
| JP | 2006-011679 A | 1/2006 |
| JP | 2006-039469 A | 2/2006 |

(Continued)

OTHER PUBLICATIONS

Extended European Search Report dated Jul. 5, 2013, issued by the European Patent Office in corresponding European Patent Application No. 12189716.9—1957/2587782. (8 pages).

(Continued)

*Primary Examiner* — Jason Olson
(74) *Attorney, Agent, or Firm* — Buchanan Ingersoll & Rooney PC

(57) ABSTRACT

A manipulation panel that is a user interface includes a display unit that displays a screen, a touch panel that detects a tap performed to the display unit, and an abnormality detector that detects a situation, in which a message is displayed on the display unit, until the touch panel detects a second tap constituting a double tap since detecting a first tap. Manipulation panel displays a warning message about the situation detected by the abnormality detector on the display unit after the touch panel detects the second tap.

33 Claims, 32 Drawing Sheets

(56) References Cited

FOREIGN PATENT DOCUMENTS

| JP | 2009-003851 A | 1/2009 |
|----|---------------|--------|
| JP | 2009-048245 A | 3/2009 |
| JP | 2010-203816 A | 9/2010 |

OTHER PUBLICATIONS

Bruchez, E. et al., "Bug 100180—UI Freezes If Alert/Dialog Comes Up While Dragging (Modal Dialog During Drag Causes Hang)", Internet Citation, URL: https://bugzilla.mozilla.org/show_bug.cgi?id=100180 [retrieved Jun. 10, 2013], pp. 1-15 (Sep. 17, 2001) XP-002699009.

Office Action (Notice of Grounds of Rejection) issued on Oct. 22, 2013, by the Japanese Patent Office in corresponding Japanese Patent Application No. 2011-235403, and an English Translation of the Office Action. (4 pages).

Office Action issued on Oct. 31, 2014, by the Chinese Patent Office in corresponding Chinese Patent Application No. 201210402393.X and an English translation of the Office Action. (12 pages).

* cited by examiner

FIG.9

| WARNING | INFLUENCED PROCESSING |
|---|---|
| NETWORK ERROR | LDAP |
| NETWORK ERROR | SMB |
| NETWORK ERROR | FTP |
| TONER EMPTY | PRINT |
| PAPER OUT | PRINT |
| HDD FULL | SCAN |

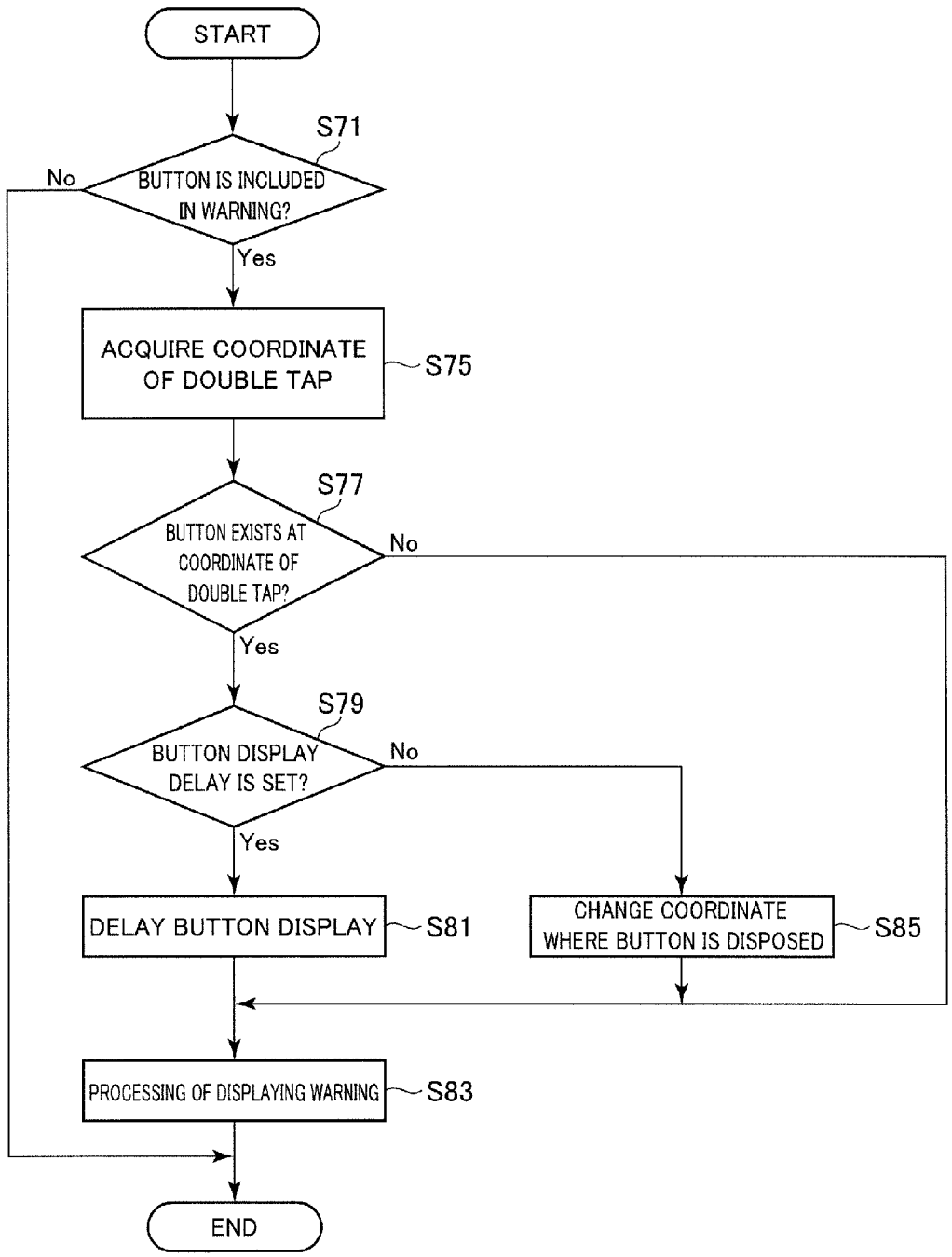

USER INTERFACE PROVIDED WITH DISPLAY UNIT FOR DISPLAYING SCREEN

This application is based on Japanese Patent Application No. 2011-235403 filed with the Japan Patent Office on Oct. 26, 2011, the entire content of which is hereby incorporated by reference.

BACKGROUND OF THE INVENTION

1. Field of the Invention

The present invention relates to a user interface, more particularly to a user interface that detects a double tap.

2. Description of the Related Art

A manipulation panel is provided as a user interface in a general image forming apparatus, such as an MFP (Multi Function Peripheral). The manipulation panel includes a display unit, such as an LCD (Liquid Crystal Display), which displays a software key and various pieces of information, a touch panel that is disposed to receive a manipulation of user's finger while overlapping a front surface of the display unit, and a hardware key that is provided around the display unit. When a tap, which is an operation to touch the touch panel and separate the finger from the touch panel, is performed to a software key displayed on the display unit, the touch panel outputs instruction information allocated to the software key.

The software key is a key group displayed on the touch panel. The user manipulates the software key by touching a predetermined domain of the touch panel display. The software keys to which various functions are allocated are displayed into various shapes on the touch panel display, and the software keys are erased when a need for the software keys is eliminated. The hardware key is a button-shaped key group including a physical substance. The user manipulates the hardware key by pressing the hardware key.

In the case that a trouble (for example, paper out, a jam, and a network connection failure) is generated in the image forming apparatus, the manipulation panel automatically displays a message notifying the user of the trouble on the touch panel in response to an instruction of the image forming apparatus. For example, the message is displayed in a pop-up format.

For example, Documents 1 and 2 described below disclose a technology related to the touch panel. In the technology disclosed in Document 1, in the case that the user touches a selection icon on the touch panel, the touched selection icon is specified based on a coordinate information from the touch panel, and a determination icon corresponding to the selection icon is displayed in a domain adjacent to the selection domain in an overlapping manner. When the user touches the determination icon, the selection of the selection icon is fixed.

Document 2 discloses the following technology. A display controller displays a key image that is a manipulation target on the display unit. A receiving domain (domain information) corresponding to the displayed key image is stored in a domain storage unit. A detector detects the touch manipulation performed by the user, and detects a touch position. A determination unit determines whether the touch position exists within a range of the receiving domain stored in the domain storage unit. A timing unit measures an elapsed time after the touch manipulation. A domain controller enlarges the receiving domain of the touch position to a predetermined range when the touch manipulation is detected, and the domain controller reduces the enlarged receiving domain to the original size when the timing unit measures the elapsed time.

Document 1: Japanese Patent Publication Laying-Open No. 2009-048245

Document 2: Japanese Patent Publication Laying-Open No. 2009-003851

A double tap is one of the manipulations performed in the touch panel by the user. The double tap is a manipulation in which a tap, which is an operation to touch the touch panel and separate the finger from the touch panel, is continuously performed twice. According to the double tap, any software key is selected by a first tap, and a function related to the selected software key can be performed by a second tap, and operability of the user can be enhanced.

FIG. 18 is a view schematically illustrating a transition of the screen displayed on the display unit when the touch panel detects the double tap in the related art.

Referring to FIG. 18(A), the manipulation panel displays the box selection screen on the display unit. The manipulation panel displays a document box, which is stored in a box of the image forming apparatus, as an icon. When the user taps twice an icon C101 of a box named "design idea report" having a box number "00000009", the touch panel detects the double tap. When the touch panel detects the double tap, the manipulation panel displays a list of files stored in the box named "design idea report" on the display unit as illustrated in FIG. 18(B).

However, unfortunately the operability of the double tap is insufficient in the related art.

FIG. 19 is a view schematically illustrating a transition of the screen displayed on the display unit when a message giving a warning about an abnormal situation of the image forming apparatus is displayed in the related art.

Referring to FIG. 19, conventionally until the touch panel detects the second tap since detecting the first tap in the double tap as illustrated in FIG. 19(A), sometimes the manipulation panel displays a warning message M101 giving the warning about the abnormal situation of the image forming apparatus on the display unit in the pop-up format as illustrated in FIG. 19(B). Therefore, pop-up warning message M101 is displayed while interrupting the double tap, and sometimes the second tap is not detected by the interruption of warning message M101.

The above problem is not limited to the user interface of the image forming apparatus, but the problem is possibly generated in all the user interfaces.

SUMMARY OF THE INVENTION

An object of the present invention is to provide a user interface that can improve the operability of the double tap.

In accordance with one aspect of the present invention, a user interface includes: a display unit for displaying a screen; a tap detector for detecting a tap performed to the display unit; a situation generation detector for detecting a situation, in which a message is displayed on the display unit, until the tap detector detects a second tap constituting a double tap since the tap detector detects a first tap; and a first message display unit for displaying the message about the situation detected by the situation generation detector on the display unit after the tap detector detects the second tap.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a view schematically illustrating a priority warning determination table stored in a fixed storage device 110.

FIG. 17 is a flowchart illustrating OK key displaying processing performed by manipulation panel 130.

DESCRIPTION OF THE PREFERRED EMBODIMENTS

Hereinafter, an embodiment of the invention will be described with reference to the drawings.

The case that a user interface is a manipulation panel of an image forming apparatus will be described in the embodiment. For example, the image forming apparatus forms an image by an electrophotographic system or an electrostatic recording system. The image forming apparatus may be an MFP having a scanner function, a facsimile function, a copying function, a function as a printer, a data communication function, and a server function, a facsimile machine, a copying machine, or a printer. The image forming apparatus may form the image by an inkjet system. The user interface detects a tap performed to a display unit that displays a screen, and the user interface may be a mobile communication terminal provided with a touch panel, for example, in addition to the manipulation panel of the image forming apparatus.

[Configuration of Image Forming Apparatus]

A configuration of the image forming apparatus of the embodiment will be described below.

Figure 1:
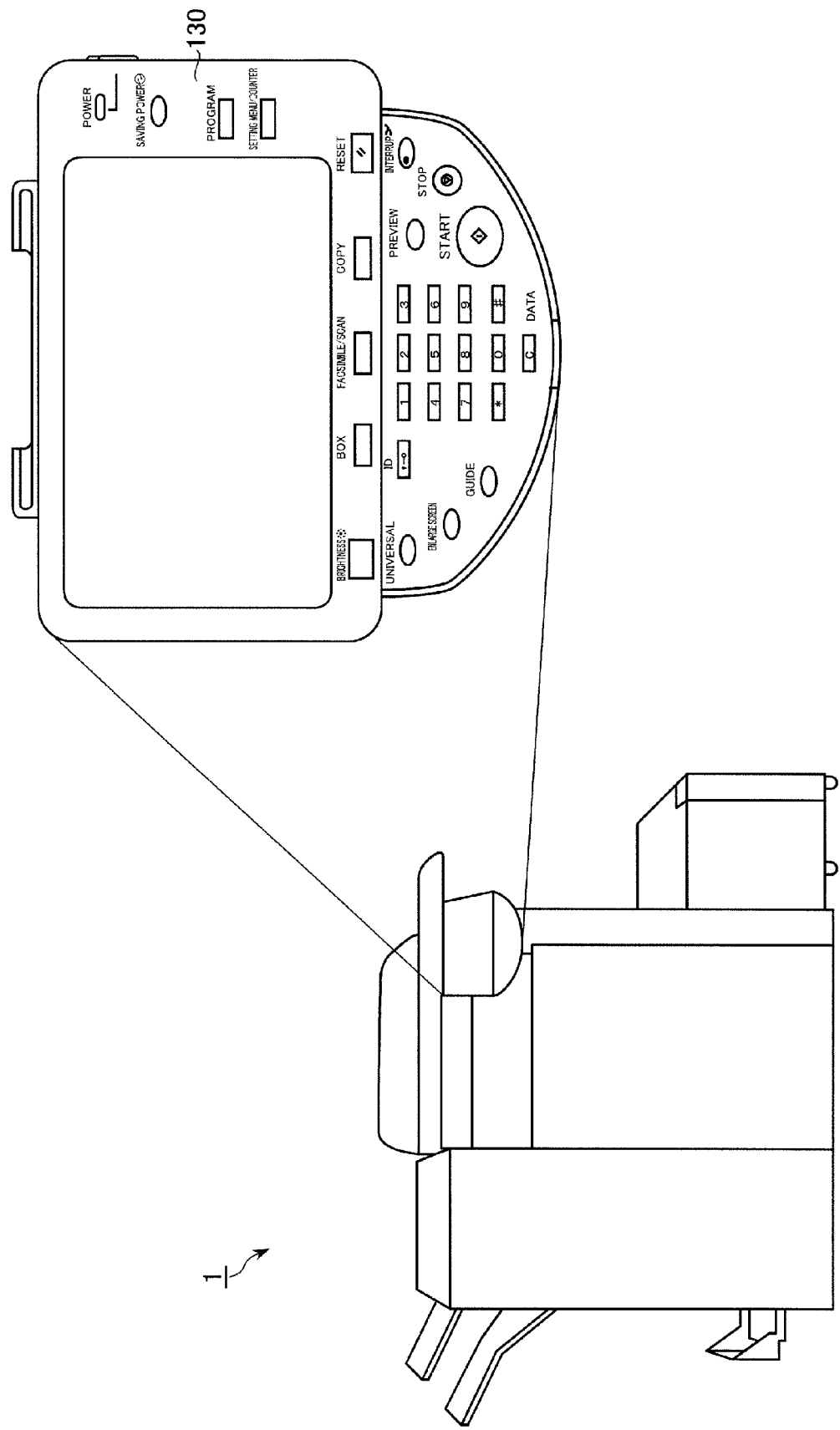
FIG. 1 is a view schematically illustrating an appearance of an image forming apparatus according to an embodiment of the present invention.

FIG. 1 is a view schematically illustrating an appearance of the image forming apparatus of the embodiment of the present invention. The enlarged manipulation panel of the image forming apparatus is illustrated in FIG. 1.

Referring to FIG. 1, an image forming apparatus 1 includes a manipulation panel 130 in a front surface thereof. Manipulation panel 130 displays various pieces of information on image forming apparatus 1, and receives an operation of image forming apparatus 1.

Figure 2:
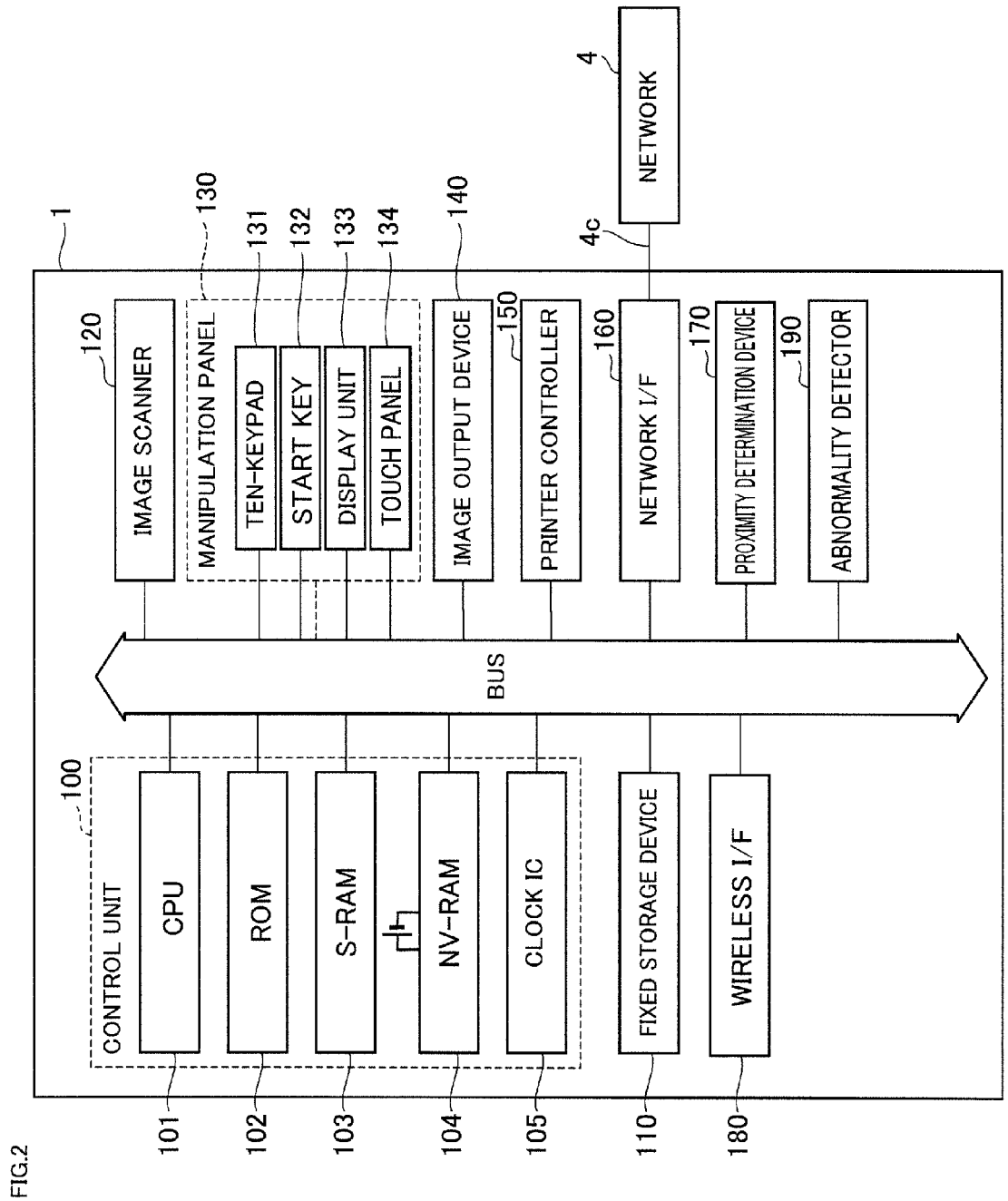
FIG. 2 is a block diagram illustrating an internal configuration of an image forming apparatus 1.

FIG. 2 is a block diagram illustrating an internal configuration image forming apparatus 1.

Referring to FIG. 2, image forming apparatus 1 includes a CPU 101, a ROM (Read Only Memory) 102, an SRAM (Static Random Access Memory) 103, an NVRAM (Non-Volatile Random Access Memory) 104, a clock IC (Integrated Circuit) 105, a fixed storage device 110, an image reader 120, a manipulation panel 130, an image output device 140, a printer controller 150, a network interface 160, a proximity determination device 170, a wireless interface 180a, and an abnormality detector 190.

ROM 102, SRAM 103, NVRAM 104, and clock IC 105 are connected to CPU 101 through a bus. A controller 100 is constructed by CPU 101, ROM 102, SRAM 103, NVRAM 104, and clock IC 105. A control program controlling an operation of image forming apparatus 1 is stored in ROM 102. SRAM 103 is a work memory of CPU 101. Various settings related to the image formation are stored in NVRAM 104 by battery backup.

Fixed storage device 110, image reader 120, manipulation panel 130, image output device 140, printer controller 150, network interface 160, proximity determination device 170, wireless interface 180, and abnormality detector 190 are connected to controller 100 through the bus. For example, fixed storage device 110 is an HDD (Hard Disk Drive), and screen data of the screen displayed on manipulation panel 130 and a box in which various files are stored are stored in fixed storage device 110. Image reader 120 reads an document image. Manipulation panel 130 includes a numerical keypad 131 that inputs a numerical character, a start key 132 that receives an instruction to perform various job, a display unit 133, such as an LCD, which displays the screen of various pieces of information, and a touch panel 134 that is disposed in a front surface of display unit 133. Touch panel 134 receives inputs of instructions, such as the tap performed to display unit 133. Image output device 140 forms a copy image on paper. Printer controller 150 generates the copy image from print data received from network interface 160. Network interface 160 connects image forming apparatus 1 to a network 4 through a network cable 4c. Network interface 160 transmits and receives various pieces of information to and from an external device. Proximity determination device 170 detects proximity of a human body to image forming apparatus 1. For example, wireless interface 180 is Bluetooth (registered trademark) or IrDA (registered trademark). Wireless interface 180 is used to conduct communication with the external device. Abnormality detector 190 detects generation of abnormal situations, such as paper out and a network error, which causes display unit 133 to display a message. Abnormality detector 190 may detect a situation that causes display unit 133 to display some sort of message.

In the embodiment, in the case that abnormality detector 190 detects the generation of the abnormal situation until touch panel 134 detects a second tap of a double tap since detecting a first tap of the double tap, manipulation panel 130 displays a message about the abnormal situation on display unit 133 after detecting the second tap. In the case that touch panel 134 does not detect the second tap for a predetermined time since the first tap is detected, manipulation panel 130 displays a warning message about the abnormal situation on display unit 133.

[Operation of Image Forming Apparatus when First Tap is Detected]

An operation of image forming apparatus 1 in the case that touch panel 134 detects the first tap in the double tap will be described below.

Figure 3:
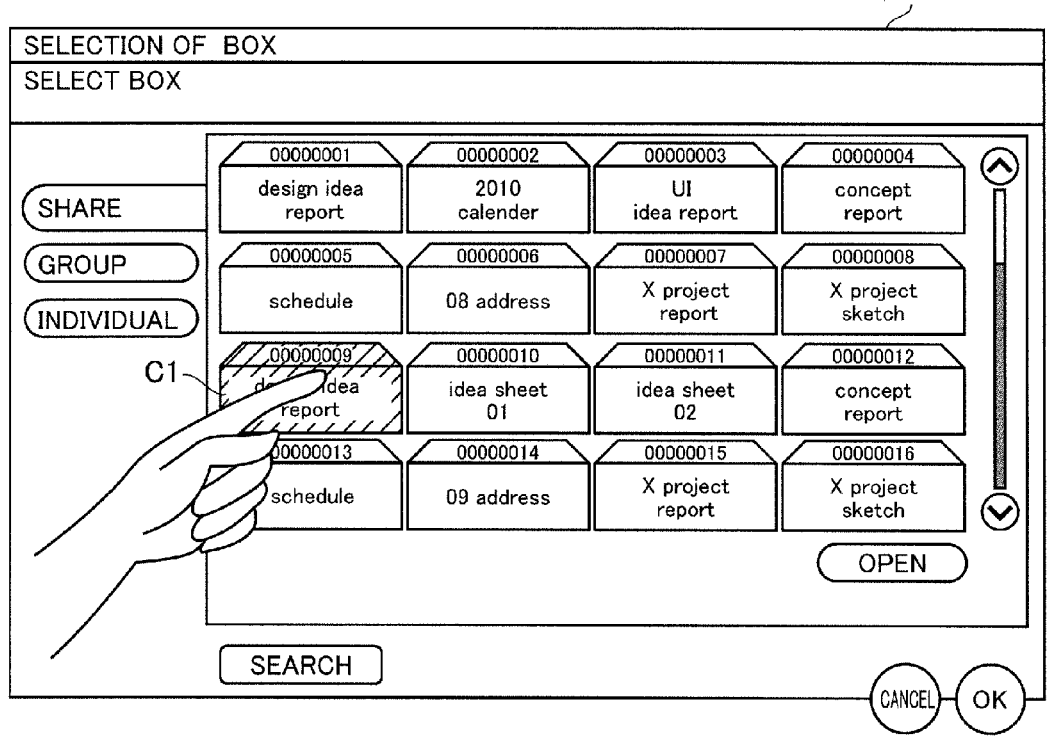
FIG. 3 is a view schematically illustrating a screen displayed on a display unit 133 by a manipulation panel 130 when a touch panel 134 detects a first tap in a double tap.

FIG. 3 is a view schematically illustrating a screen displayed on display unit 133 by manipulation panel 130 when touch panel 134 detects the first tap in the double tap.

Referring to FIG. 3, manipulation panel 130 performs icon display of a box selection screen that is a list of boxes stored in fixed storage device 110. For example, when a user taps once an icon C1 of the box named "design idea report" having a box number "00000009", touch panel 134 detects the first tap of icon C1.

When touch panel 134 detects the first tap of icon C1, manipulation panel 130 displays icon C1 in a color different from that of other icons in order to indicate that the box corresponding to icon C1 is selected. Manipulation panel 130 starts timing with a double-tap determination timer (clock IC 105) at the time the user taps icon C1 (screen). The double-tap determination timer determines whether the next tap becomes the double tap. In the case that abnormality detector 190 detects the generation of the abnormal situation during the double-tap determination, manipulation panel 130 suspends the display of the warning message about the abnormal situation until the double-tap determination is completed.

Figure 4:
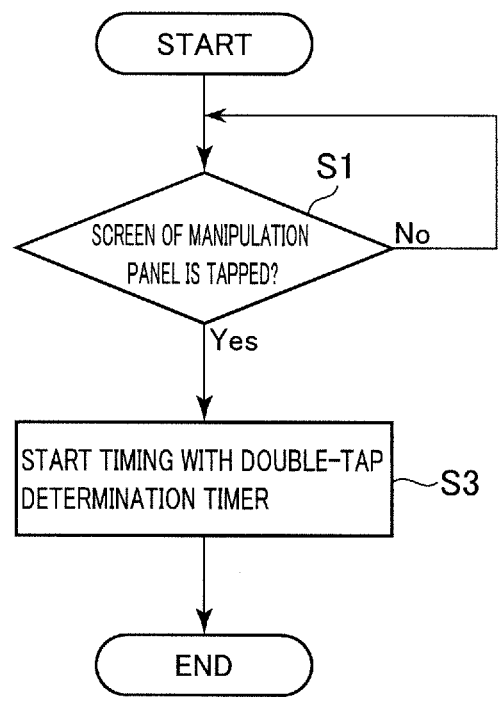
FIG. 4 is a flowchart illustrating an operation of image forming apparatus 1 when touch panel 134 detects the first tap.

FIG. 4 is a flowchart illustrating an operation of image forming apparatus 1 when touch panel 134 detects the first tap. The flowcharts in FIGS. 4, 5, 7, 8, 11, 12, and 17 are performed by CPU 101 based on the control program stored in ROM 102, for example.

Referring to FIG. 4, CPU 101 determines whether the screen of manipulation panel 130 is tapped (pressed) (S1). When the screen of manipulation panel 130 is determined as tapped in step S1 (Yes in S1), CPU 101 starts the timing with the double-tap determination timer (S3). Then CPU 101 ends the processing. On the other hand, when the screen of manipulation panel 130 is determined as not tapped in step S1 (No in S1), CPU 101 goes to the processing in step S1 to determine again whether the screen of manipulation panel 130 is tapped (S1).

Figure 5:
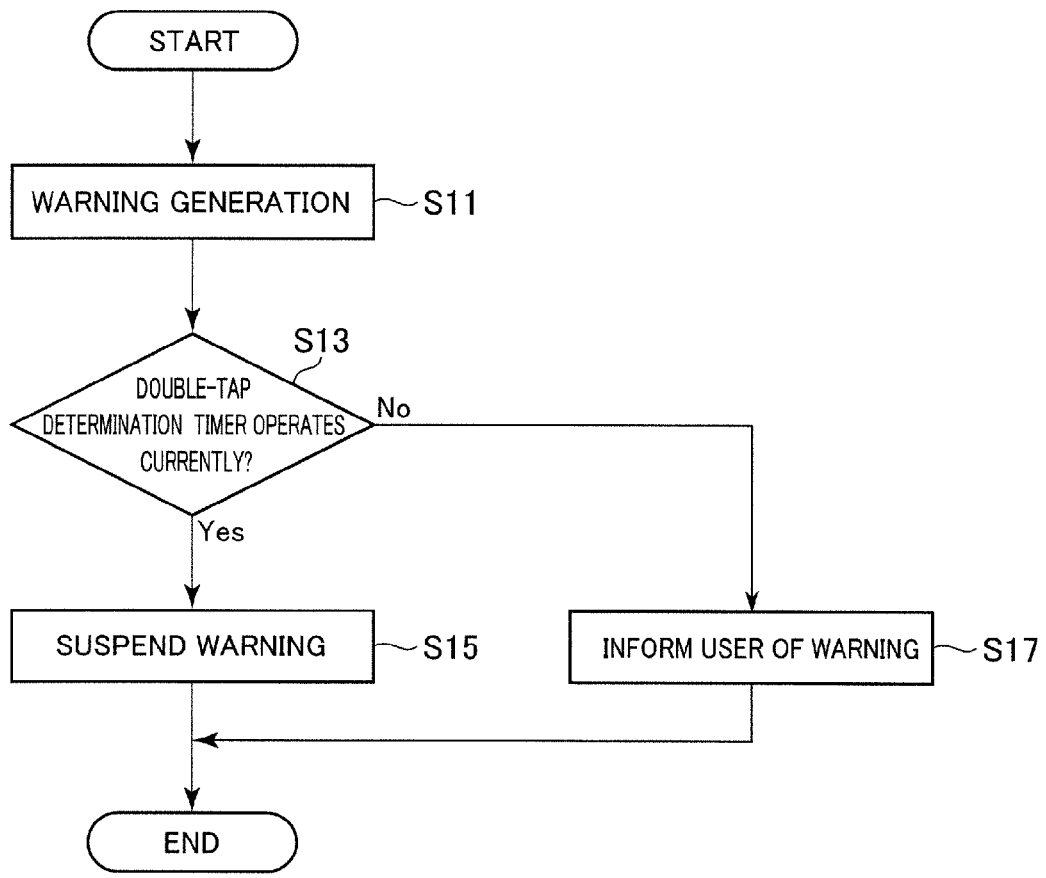
FIG. 5 is a flowchart illustrating an operation of image forming apparatus 1 when an abnormality detector 190 detects generation of an abnormal situation.

FIG. 5 is a flowchart illustrating an operation of image forming apparatus 1 when abnormality detector 190 detects the generation of the abnormal situation.

Referring to FIG. 5, when abnormality detector 190 detects the generation of the abnormal situation (warning generation) (S11), CPU 101 determines whether the double-tap determination timer currently performs the timing (the double-tap determination timer operates currently) (S13).

When the double-tap determination timer is determined as currently performs the timing in step S13 (Yes in S13), CPU 101 suspends the display of the warning message about the abnormal situation (S15). Then CPU 101 ends the processing. On the other hand, when the double-tap determination timer is determined as not currently perform the timing (No in S13), CPU 101 displays the warning message about the abnormal situation on display unit 133 (S17). Then CPU 101 ends the processing.

[Operation of Image Forming Apparatus when Double Tap is Detected]

An operation of image forming apparatus 1 in the case that touch panel 134 detects the double tap will be described below.

In the case that touch panel 134 detects the double tap, manipulation panel 130 may cause display unit 133 to transition to a screen associated with processing of the double-tap in priority to the display of the warning message about the abnormal situation detected by abnormality detector 190. Manipulation panel 130 may display the warning message about the abnormal situation detected by abnormality detector 190 in priority to the transition of display unit 133 to the screen associated with the processing of the double tap.

At first the case that manipulation panel 130 gives a priority to the transition of display unit 133 to the screen associated with the processing of the double tap when touch panel 134 detects the double tap will be described.

FIG. 6 is a view schematically illustrating the transition of the screen displayed on display unit 133 by manipulation panel 130 when touch panel 134 detects the double tap.

Figure 6A:
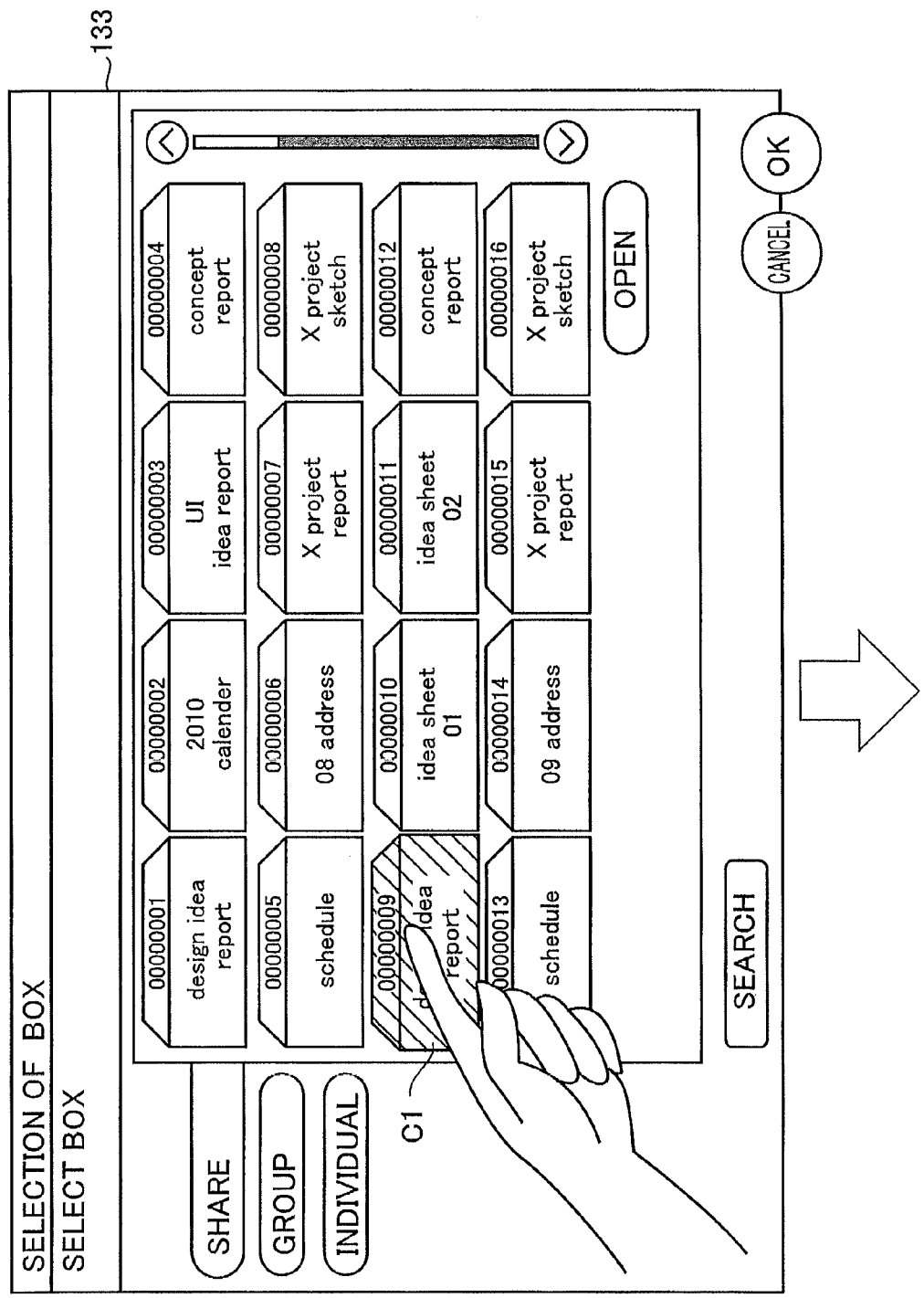
FIGS. 6(A) to 6(E) are a view schematically illustrating a transition of the screen displayed on display unit 133 by manipulation panel 130 when touch panel 134 detects the double tap.

Referring to FIG. 6(A), manipulation panel 130 displays the box selection screen. Manipulation panel 130 displays document boxes, which are stored in the box of fixed storage device 110, as the icon. For example, when the user taps once icon C1 of the box named "design idea report" having the box number "00000009", touch panel 134 detects the first tap of icon C1. Manipulation panel 130 displays icon C1 in a color different from that of other icons, and clock IC 105 starts the timing with the double-tap determination timer.

Figure 6B:
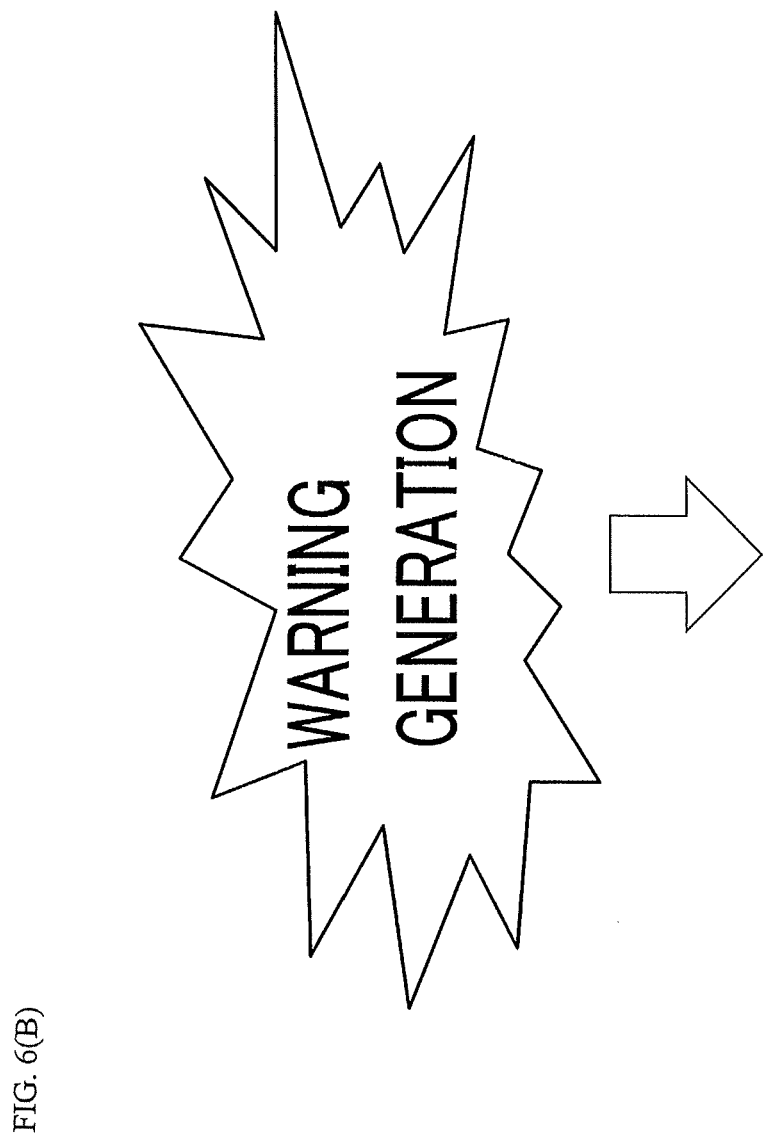

Referring to FIG. 6(B), abnormality detector 190 detects the generation of the abnormal situation until touch panel 134 detects the second tap since detecting the first tap. Because the double-tap determination timer currently performs the timing, manipulation panel 130 suspends the display of the warning message about the abnormal situation, and waits for the second tap of the user.

Figure 6C:
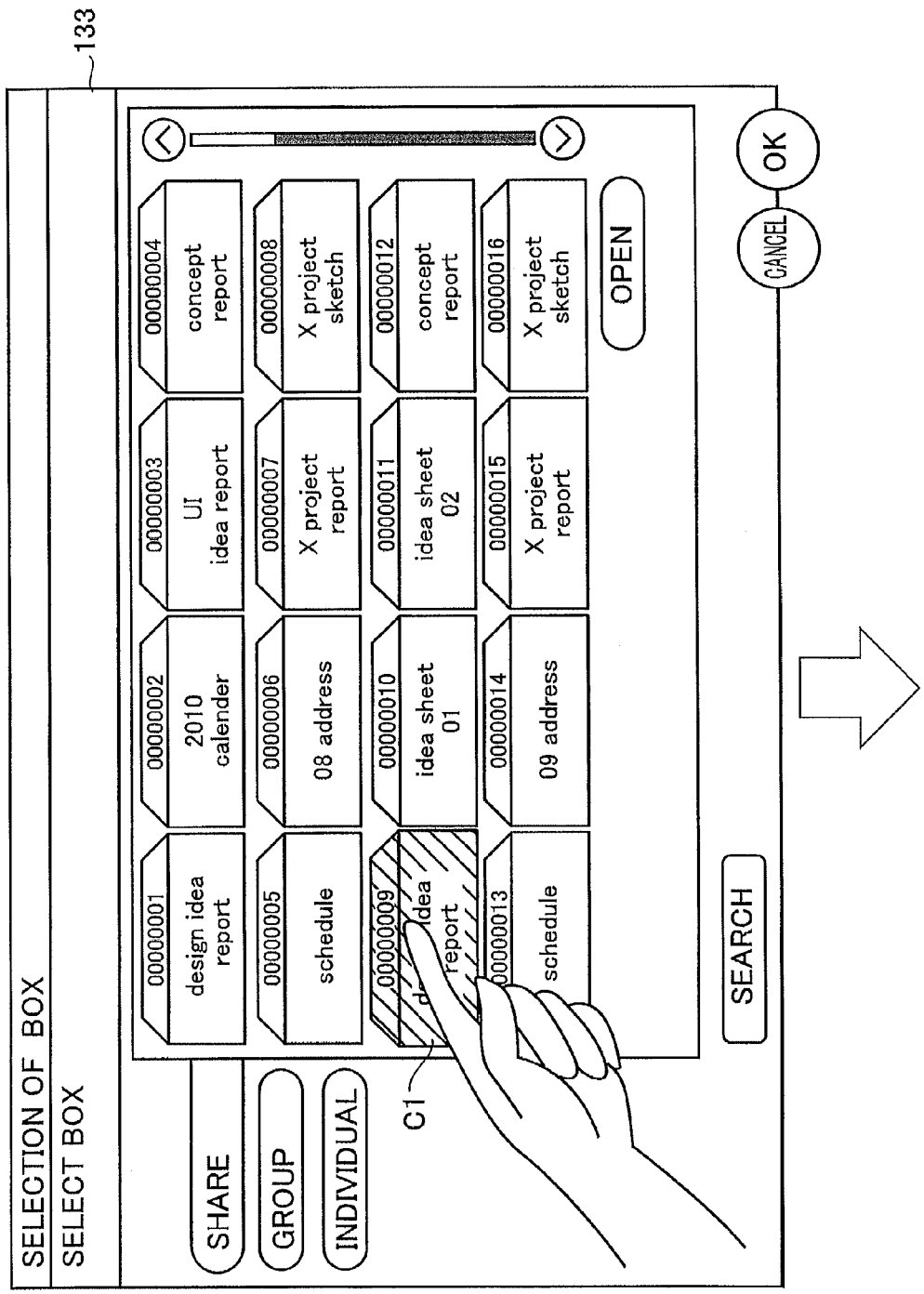

Referring to FIG. 6(C), in the case that the user taps icon C1 again before a determination time elapses since the double-tap determination timer starts the timing, touch panel 134 detects the second tap (the double tap) of icon C1.

Figure 6D:
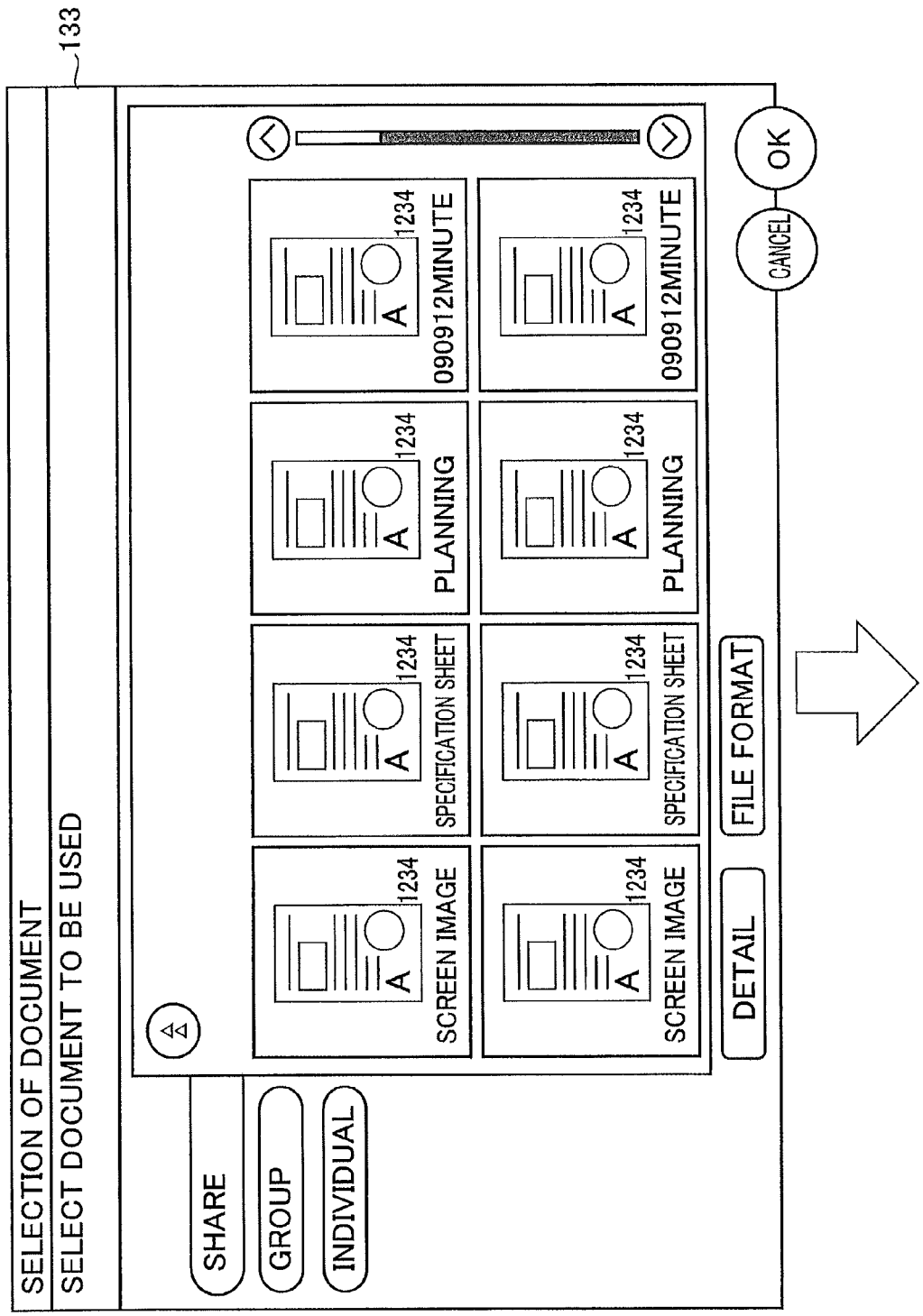

Referring to FIG. 6(D), when touch panel 134 detects the double tap, manipulation panel 130 transitions to the screen associated with the processing of the double tap in priority to the display of the warning message. The processing of the double tap is one in which an instruction to perform the processing is received from the user by the double tap. For example, the processing of the double tap is one that is related to an item selected by the first tap. Specifically, in the case that manipulation panel 130 displays the box selection screen, when the second tap is received after the box is selected by the first tap, image forming apparatus 1 performs processing of opening the box, and causes display unit 133 to transition to the screen on which the list of files stored in the box.

Figure 6E:
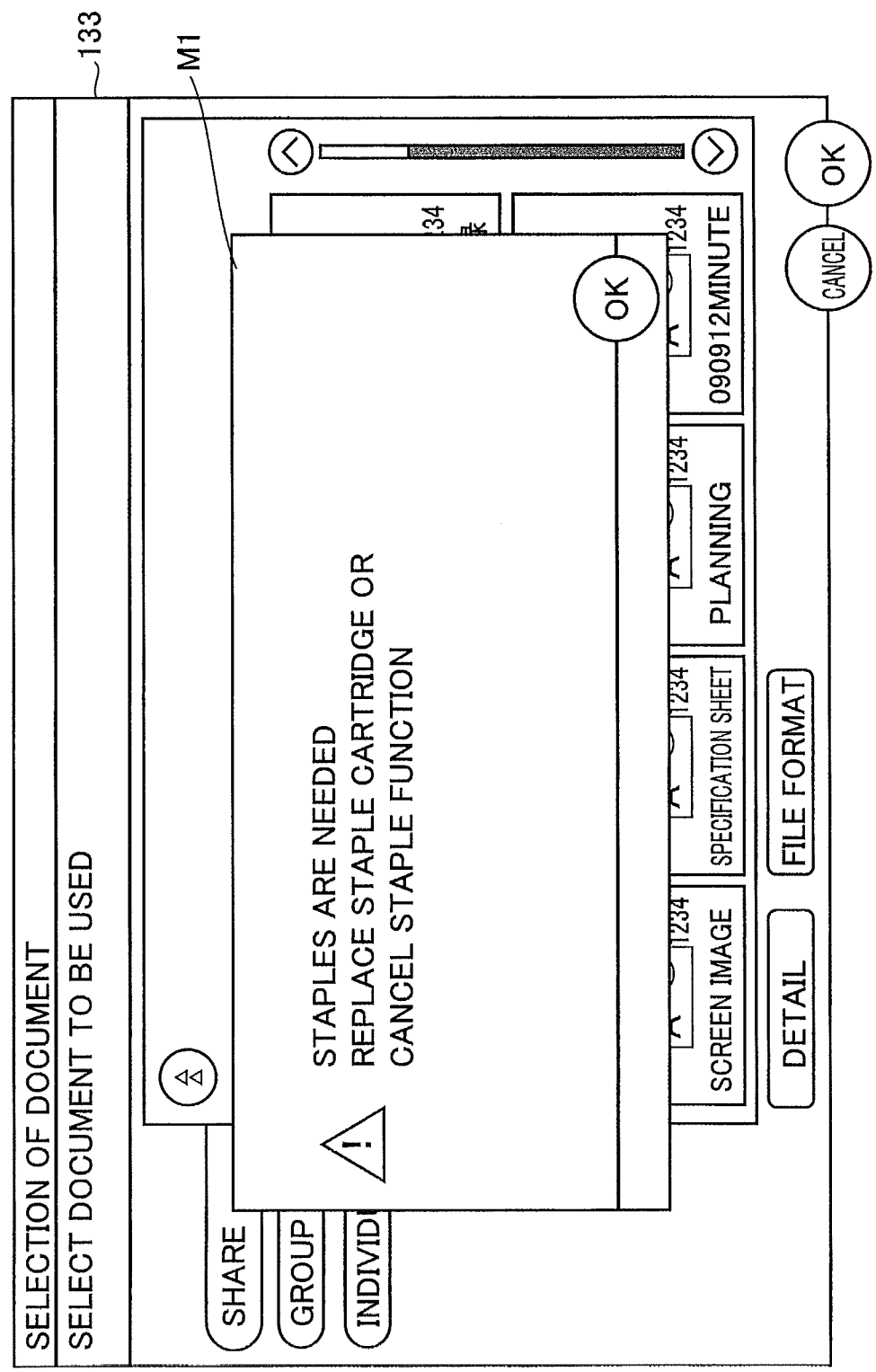

Referring to FIG. 6(E), after causing display unit 133 to transition to the screen associated with the processing of the double tap, manipulation panel 130 displays a warning message M1 (a warning pop-up message) about the abnormal situation detected by abnormality detector 190 on display unit 133. Desirably warning message M1 is displayed in a pop-up format. Therefore, the user can check warning message M1 after the processing of the double tap is performed.

In the case that the need to display the message about the abnormal situation detected by abnormality detector 190 is eliminated (the abnormal situation is resolved) before warning message M1 is displayed, manipulation panel 130 may not display warning message M1 (may cancel the display of warning message M1).

In the case that touch panel 134 does not detect the second tap of the user for a predetermined time since the double-tap determination timer starts the timing in FIG. 6(B) (that is, in the case that the timing period of the double-tap determination timer is expired without performing the second tap of the user), manipulation panel 130 may display warning message M1 about the abnormal situation detected by abnormality detector 190 on display unit 133 as illustrated in FIG. 6(E).

Figure 7:
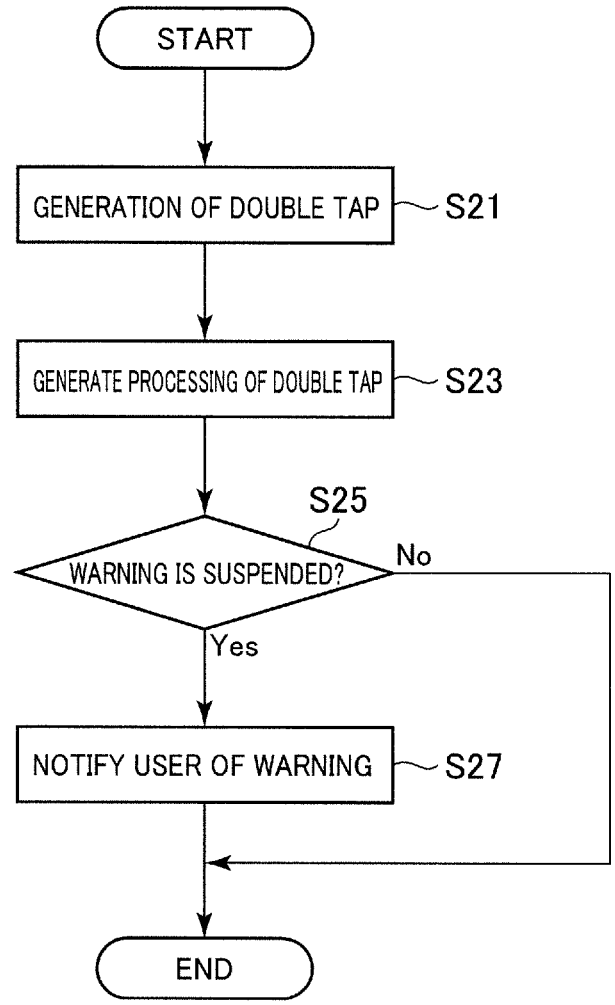
FIG. 7 is a flowchart illustrating an operation of image forming apparatus 1 when touch panel 134 detects the double tap.

FIG. 7 is a flowchart illustrating an operation of image forming apparatus 1 when touch panel 134 detects the double tap.

Referring to FIG. 7, when touch panel 134 detects the generation of the double tap (S21), CPU 101 generates the processing of the double tap (a double-tap operation) (S23). CPU 101 determines whether the display of the warning message about the abnormal situation is suspended (S25).

When the display of the warning message about the abnormal situation is determined as suspended in step S25 (Yes in S25), CPU 101 displays the warning message on display unit 133 to notifies the user of the warning (S27). Then CPU 101 ends the processing. On the other hand, when the display of the warning message about the abnormal situation is not suspended (No in S25), CPU 101 ends the processing.

Figure 8:
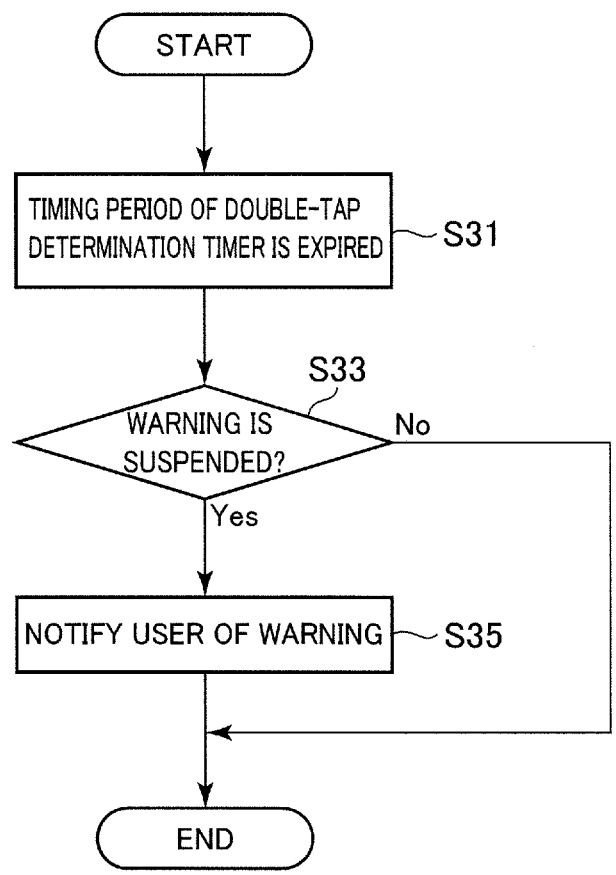
FIG. 8 is a flowchart illustrating an operation of image forming apparatus 1 when a timing period of a double-tap determination timer is expired.

FIG. 8 is a flowchart illustrating an operation of image forming apparatus 1 when the timing period of the double-tap determination timer is expired.

Referring to FIG. 8, when the timing period of the double-tap determination timer is expired (S31), CPU 101 determines whether the display of the warning message about the abnormal situation is suspended (S33).

When the display of the warning message about the abnormal situation is determined as suspended in step S33 (Yes in S33), CPU 101 displays the warning message on display unit 133 to notify the user of the warning (S35). Then CPU 101 ends the processing. On the other hand, when the display of the warning message about the abnormal situation is determined as not suspended in step S33 (No in S33), CPU 101 ends the processing.

The case that manipulation panel 130 preferentially displays the warning message about the abnormal situation detected by abnormality detector 190 when touch panel 134 detects the double tap will be described below.

Hereinafter, sometimes the operation to display the warning message about the abnormal situation detected by abnormality detector 190 on display unit 133 in priority to the transition of display unit 133 to the screen associated with the processing of the double tap is referred to as priority warning.

For example, in the case that the processing of the double tap cannot be performed due to the abnormal situation detected by abnormality detector 190 (in the case that the generated warning has an influence on the processing of the double tap), manipulation panel 130 performs the priority warning. Manipulation panel 30 may perform the priority warning in other cases.

FIG. 9 is a view schematically illustrating a priority warning determination table stored in fixed storage device 110.

Referring to FIG. 9, a relationship between the abnormal situation (the warning) and the processing of the double tap (influenced processing) that cannot be performed due to the generation of the abnormal situation is described in the priority warning determination table. According to the priority warning determination table, when a network error is generated as the abnormal situation, an LDAP (Lightweight Directory Access Protocol), an SMB (Server Message Block), and an FTP (File Transfer Protocol) cannot be performed as the processing of the double tap. Because these pieces of processing are performed using the network, the pieces of processing cannot be performed while the network error is generated. In the case that toner empty or the paper out (absence of paper) is generated as the abnormal situation, printing cannot be performed as the processing of the double tap. Because the toner and the paper are used in the printing, the printing cannot be performed in the state of the toner empty or the paper out. In the case that HDD full (in the case that an empty capacity of fixed storage device 110 is zero) is generated as the abnormal situation, scan cannot be performed as the processing of the double tap. In the HDD-full state, the data cannot be stored after the scan.

Image forming apparatus 1 determines whether the processing of the double tap detected by touch panel 134 cannot be performed based on the priority warning determination table. When the processing of the double tap detected by touch panel 134 cannot be performed, manipulation panel 130 displays the warning message about the abnormal situation detected by abnormality detector 190 on display unit 133 (performs the priority warning) in priority to the performance of the processing of the double tap.

FIG. 10 is a view schematically illustrating the transition of the screen displayed on display unit 133 by manipulation panel 130 when the priority warning is issued. FIG. 10 illustrates, as an example of the priority warning, the case that manipulation panel 30 displays the warning message about the network error in priority to performance of processing of adding an address in facsimile transmission in which the LDAP is used.

Figure 10A:
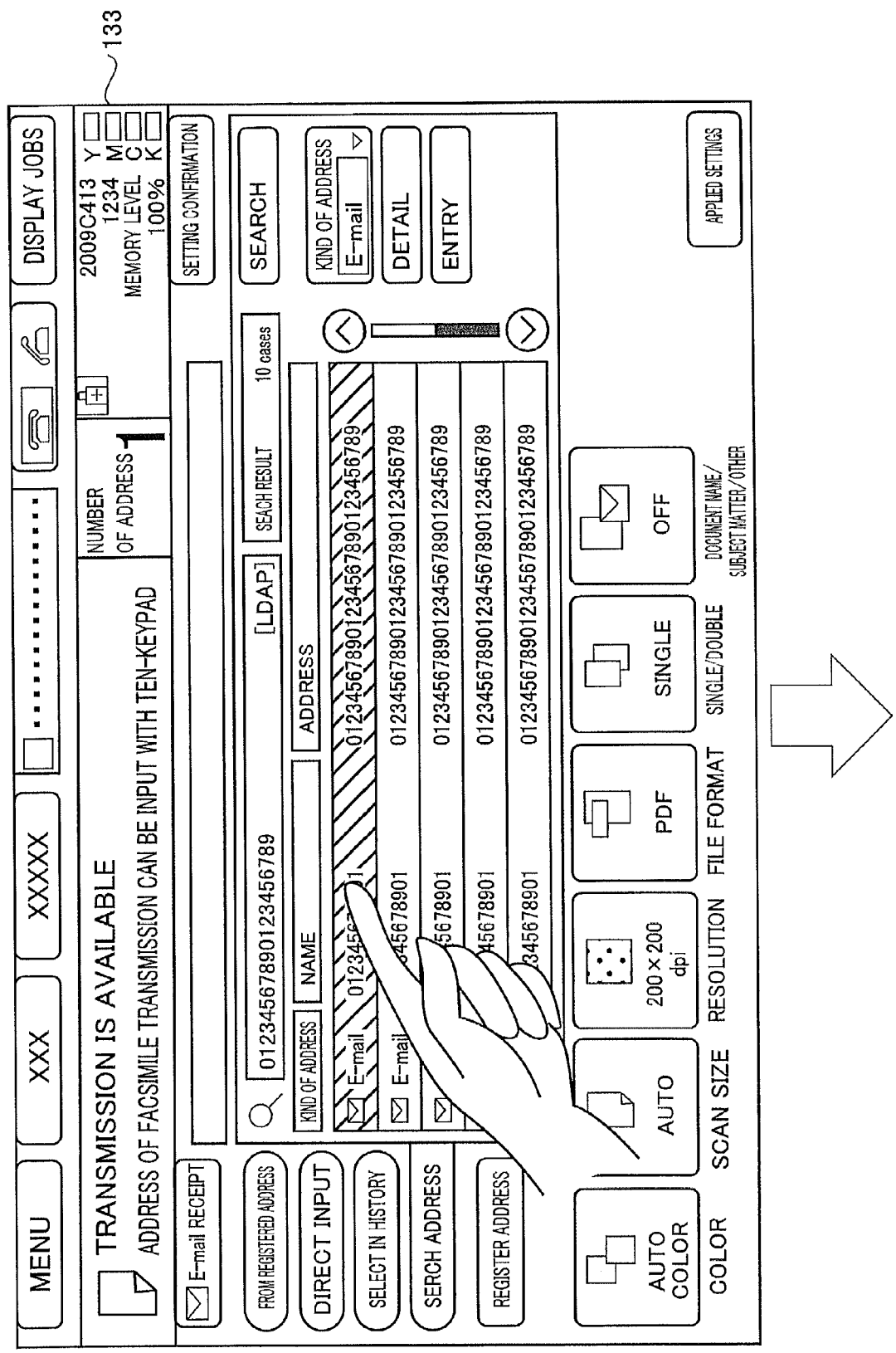
FIGS. 10(A) to 10(E) are a view schematically illustrating a transition of the screen displayed on display unit 133 by manipulation panel 130 when priority warning is issued.

Referring to FIG. 10(A), manipulation panel 130 displays a list of addresses in the case that the facsimile transmission is performed to the external device through the network. For example, when the user taps the address of the upper-most stage of the list once, touch panel 134 detects the selection of the address. Manipulation panel 130 displays the selected address in a color different from that of other addresses, and the double-tap determination timer starts the timing.

Figure 10B:
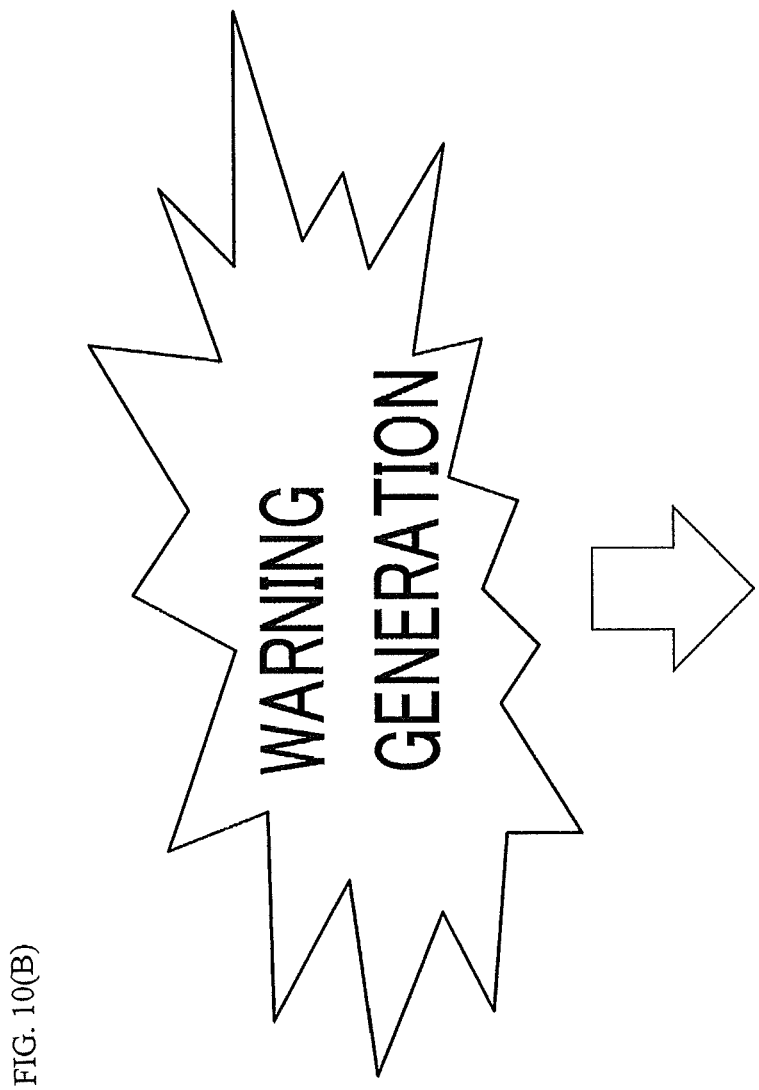

Referring to FIG. 10(B), abnormality detector 190 detects the generation of the network error until touch panel 134 detects the second tap since detecting the first tap. Because the double-tap determination timer currently performs the timing, manipulation panel 130 suspends the display of the warning message about the network error, and waits for the second tap of the user.

Figure 10C:
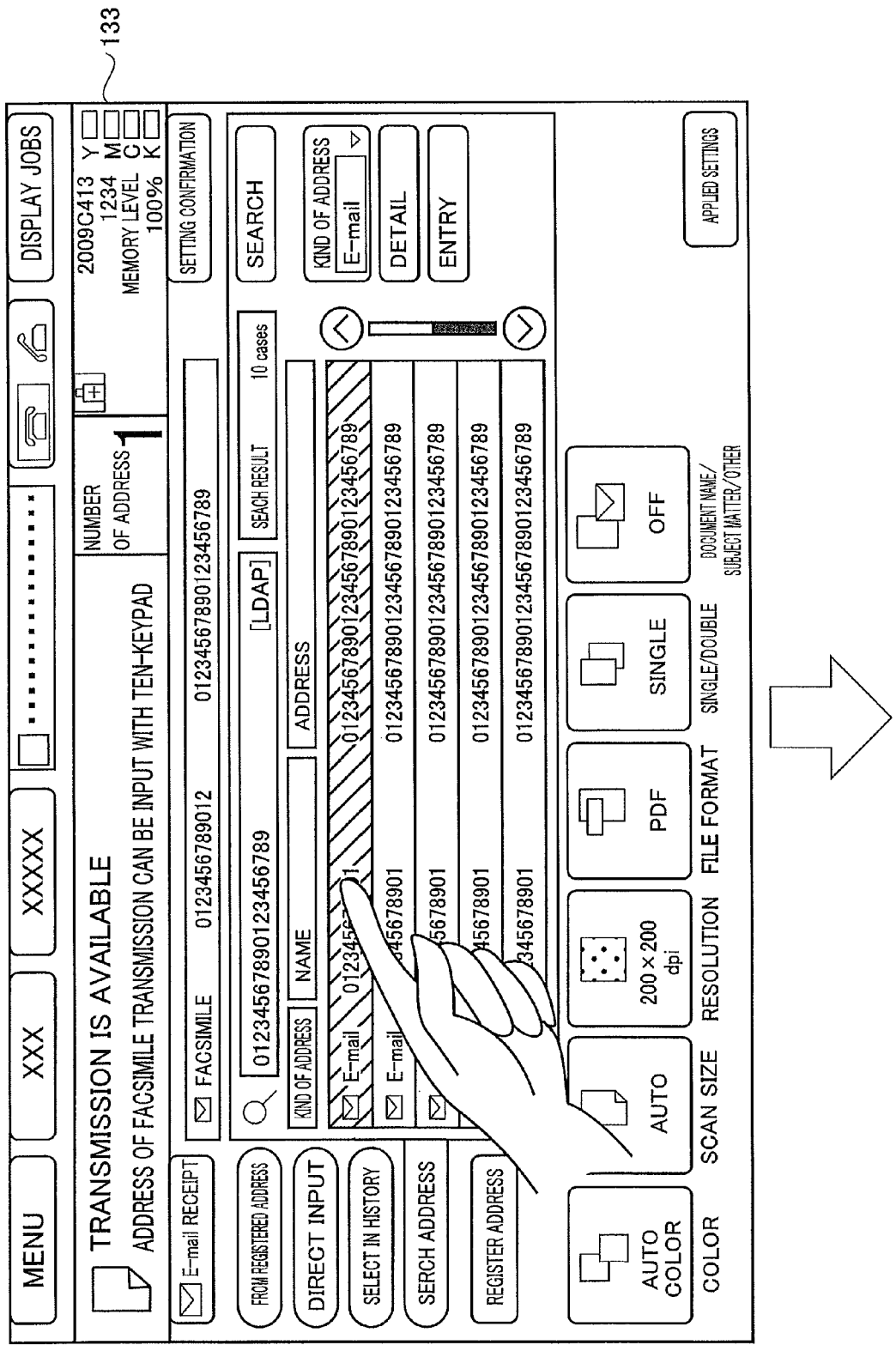

Referring to FIG. 10(C), in the case that the user taps the selected address again before a determination time elapses since the double-tap determination timer starts the timing, touch panel 134 detects an instruction to add the selected address to a destination of the facsimile transmission. In this case, even if the processing of adding the selected address to the destination of the facsimile transmission is performed while the display of the warning message about the network error is suppressed, image forming apparatus 1 cannot perform the facsimile transmission due to the network error.

Figure 10D:
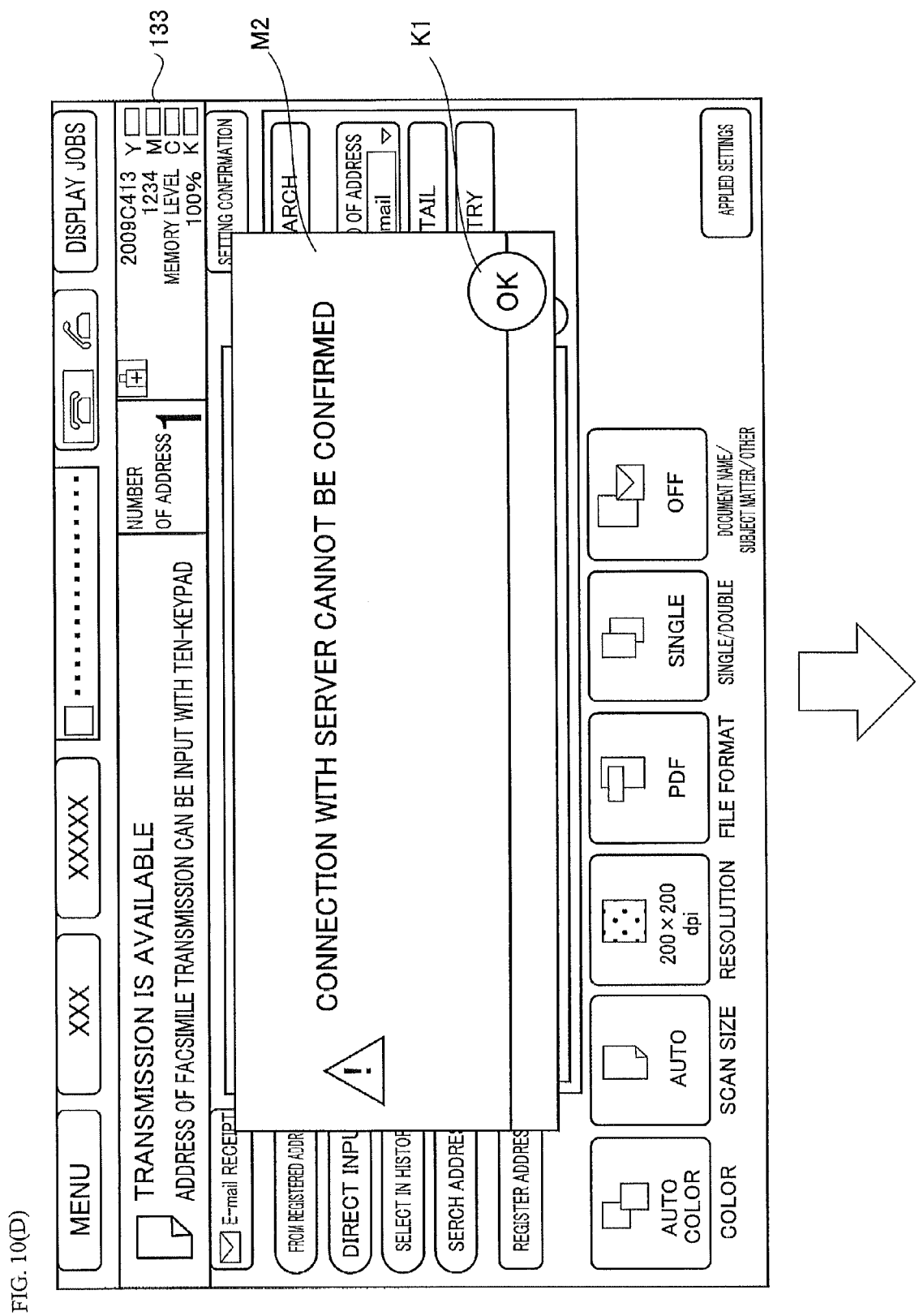

Therefore, as illustrated in FIG. 10(D), manipulation panel 130 performs the priority warning in the case that touch panel 134 detects the instruction to add the address by the double tap while abnormality detector 190 detects the network error. Image forming apparatus 1 suspends the transition to the screen associated with the address adding processing, and displays a warning message M2 about the network error on display unit 133. Warning message M2 may include an OK key (OK button) K1 erasing warning message M2 from the screen. Therefore, image forming apparatus 1 can urge the user to recover the abnormal state, and the user can recover the abnormal state during the display of warning message M2.

Figure 10E:
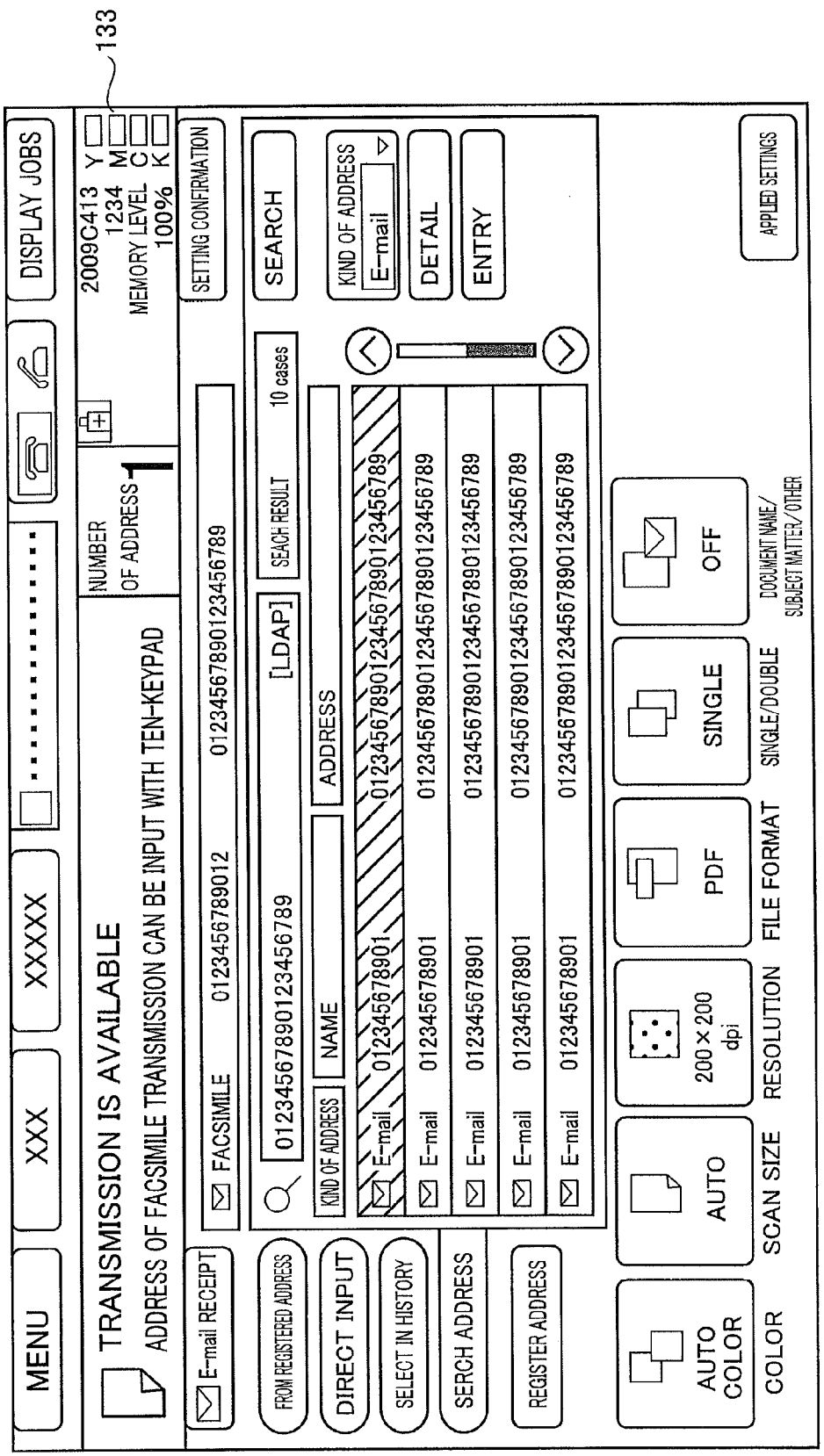

Referring to FIG. 10(E), when OK key K1 is pressed, manipulation panel 130 erases warning message M2 from the screen to determine whether the network error is resolved. When the network error is resolved, image forming apparatus 1 performs the address adding processing. On the other hand, when the network error is not resolved, image forming apparatus 1 cancels the address adding processing.

In the case that warning message M2 is erased from the screen, manipulation panel 130 does not the determination in FIG. 10(E), but may always cancel the address adding processing.

Figure 11:
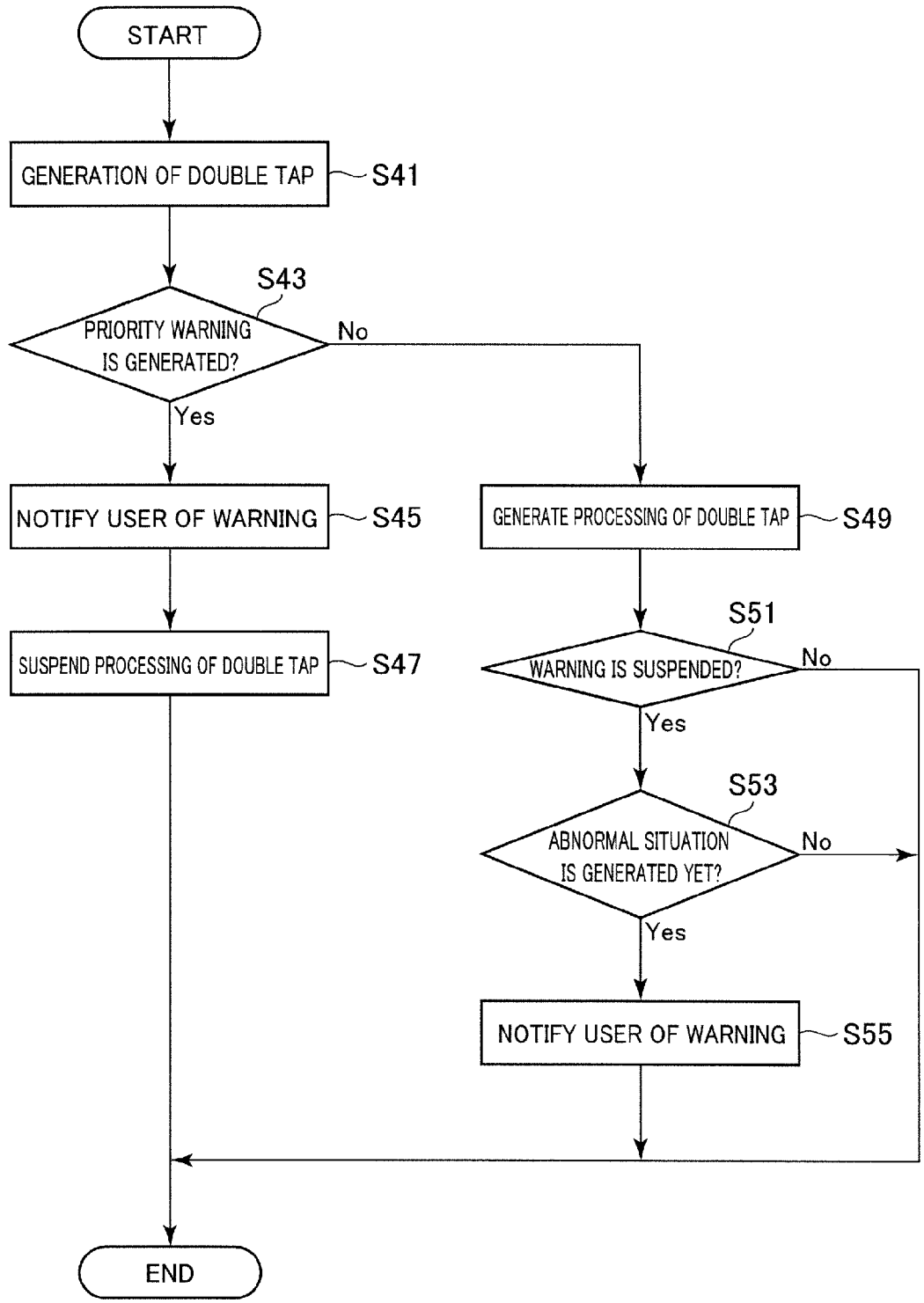
FIG. 11 is a flowchart illustrating an operation of image forming apparatus 1 when the priority warning is issued.

FIG. 11 is a flowchart illustrating the operation of image forming apparatus 1 when the priority warning is issued.

Referring to FIG. 11, when touch panel 134 detects the generation of the double tap (S41), CPU 101 determines whether the processing of the detected double tap cannot be performed (whether the priority warning is generated) based on the priority warning determination table (S43).

When the processing of the double tap is determined as unperformable in step S43 (Yes in S43), CPU 101 displays the warning message on display unit 133 to notify the user of the warning (S45), and CPU 101 suspends the processing of the double tap (S47). Then CPU 101 ends the processing.

When the processing of the double tap is determined as performable in step S43 (No in S43), CPU 101 generates the processing of the double tap (the double-tap operation), and causes display unit 133 to transition to the screen associated with the processing of the double tap (S49). Then CPU 101 determines whether the display of the warning message about the abnormal situation is suspended (S51).

When the display of the warning message about the abnormal situation is determined as suspended in step S51 (Yes in S51), CPU 101 determines whether the abnormal situation is generated yet (whether the warning is generated yet) (S53).

When the abnormal situation is determined as generated yet in step S53 (Yes in S53), CPU 101 displays the warning message on display unit 133 to notify the user of the warning (S55). Then CPU 101 ends the processing.

When the display of the warning message about the abnormal situation is determined as not suspended in step S51 (No in S51), or when the abnormal situation is determined as already resolved in step S53 (No in S53), it is not necessary to display the message about the abnormal situation. In this case, CPU 101 ends the processing without displaying the warning message.

Figure 12:
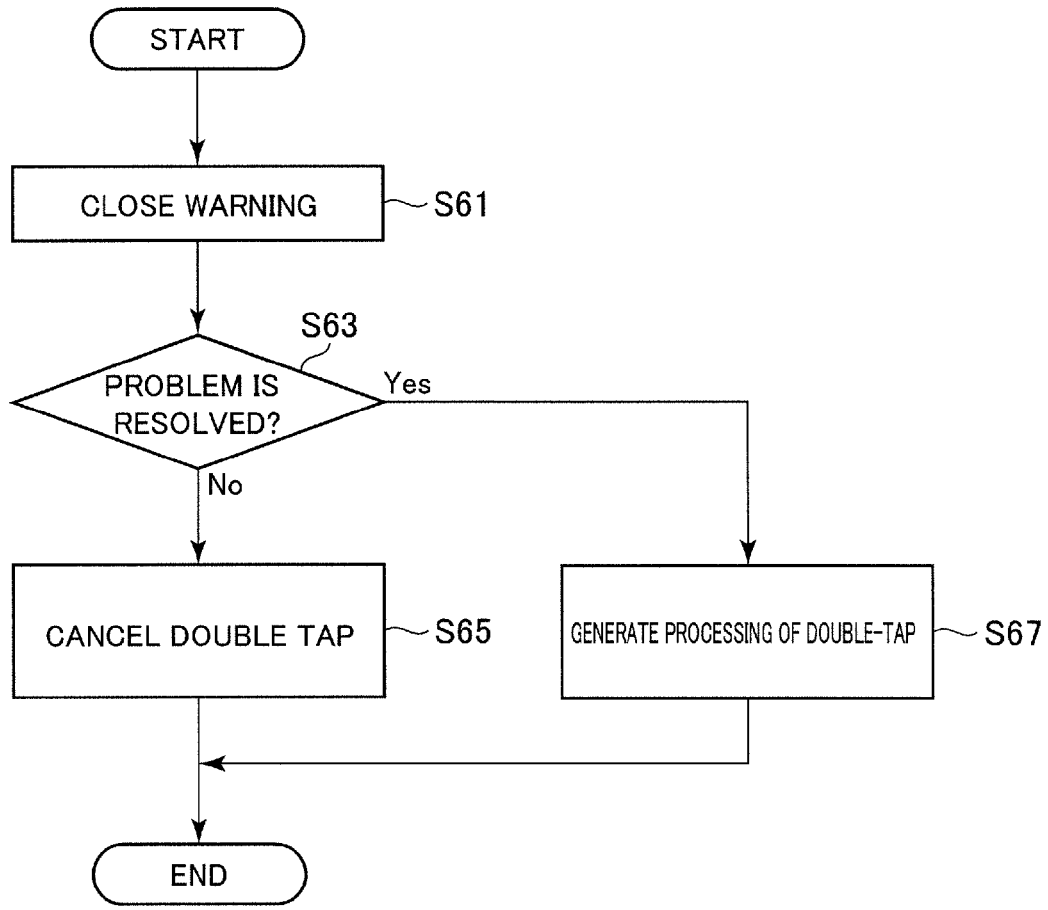
FIG. 12 is a flowchart illustrating an operation of image forming apparatus 1 when an OK key is pressed.

FIG. 12 is a flowchart illustrating an operation of image forming apparatus 1 when the OK key is pressed.

Referring to FIG. 12, when OK key K1 included in warning message M2 is pressed, CPU 101 erases (closes) warning message M2 from the screen (S61), and determines whether the abnormal situation (the problem) related to the warning message is resolved (S63).

When the abnormal situation is determined as not resolved in step S63 (No in S63), CPU 101 cancels the processing of the double tap (S65). Then CPU 101 ends the processing. On the other hand, when the abnormal situation is determined as resolved in step S63 (Yes in S63), CPU 101 generates the processing of the double tap (the double-tap operation) (S67). Then CPU 101 ends the processing.

Manipulation panel 130 may receive a setting giving a priority to which one of the transition of display unit 133 to the screen associated with the processing of the double tap and the display of the warning message about the abnormal situation detected by abnormality detector 190 on display unit 133 (hereinafter sometimes referred to as double-tap specification) from the user. The setting may be stored as an initial setting of image forming apparatus 1 in fixed storage device 110.

Figure 13:
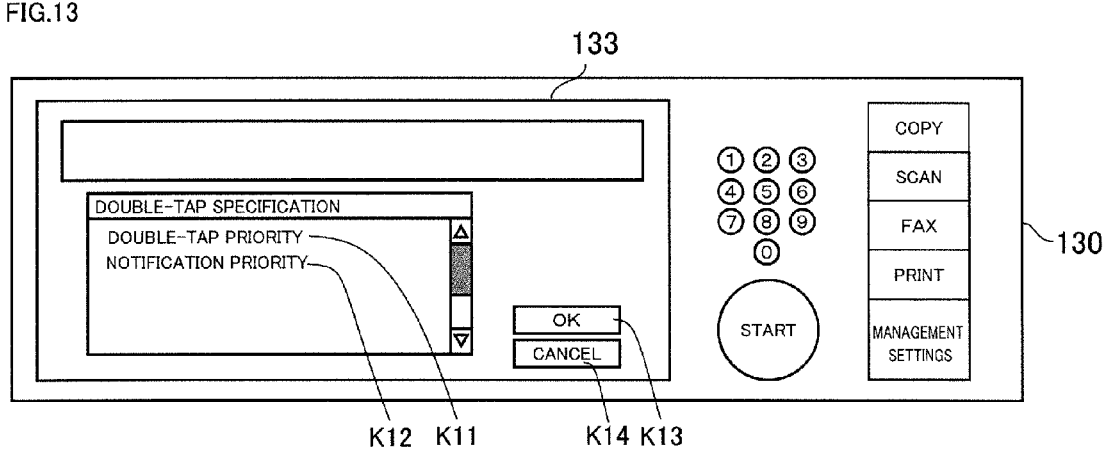
FIG. 13 is a view schematically illustrating a screen displayed on display unit 133 by manipulation panel 130 when a double tap specification is received from a user.

FIG. 13 is a view schematically illustrating the screen displayed on display unit 133 by manipulation panel 130 when the double-tap specification is received from the user.

Referring to FIG. 13, in the case that the double tap specification is received from the user, manipulation panel 130 displays a double-tap priority key K11, a notification priority key K12, an OK key K13, and a cancel key K14. When receiving double-tap priority key K11 selected by the user and OK key K13 pressed by the user, manipulation panel 130 gives a priority to the transition of display unit 133 to the screen associated with the processing of the double tap. When receiving notification priority key K12 selected by the user and OK key K13 pressed by the user, manipulation panel 130 gives a priority to the display of the warning message about the abnormal situation detected by abnormality detector 190 on display unit 133 (performs the priority display). When receiving cancel key K14 pressed by the user, manipulation panel 130 terminates the key selection.

[OK Key Displaying Method]

An OK Key displaying method in the case that a position where the OK key should be displayed overlaps a position where the double tap is detected will be described below.

In the case that the position of the OK key included in the warning message overlaps the position where the double tap is performed, manipulation panel 130 may move the position of the key included in the warning message to the position different from the position of the double tap, or delay the time the OK key is displayed compared with the time the warning message is displayed. Therefore, the user can be prevented from mistakenly pressing the OK key.

FIG. 14 is a view schematically illustrating a first example of the transition of the screen displayed on display unit 133 by manipulation panel 130 when the warning message including the OK key is displayed.

Figure 14A:
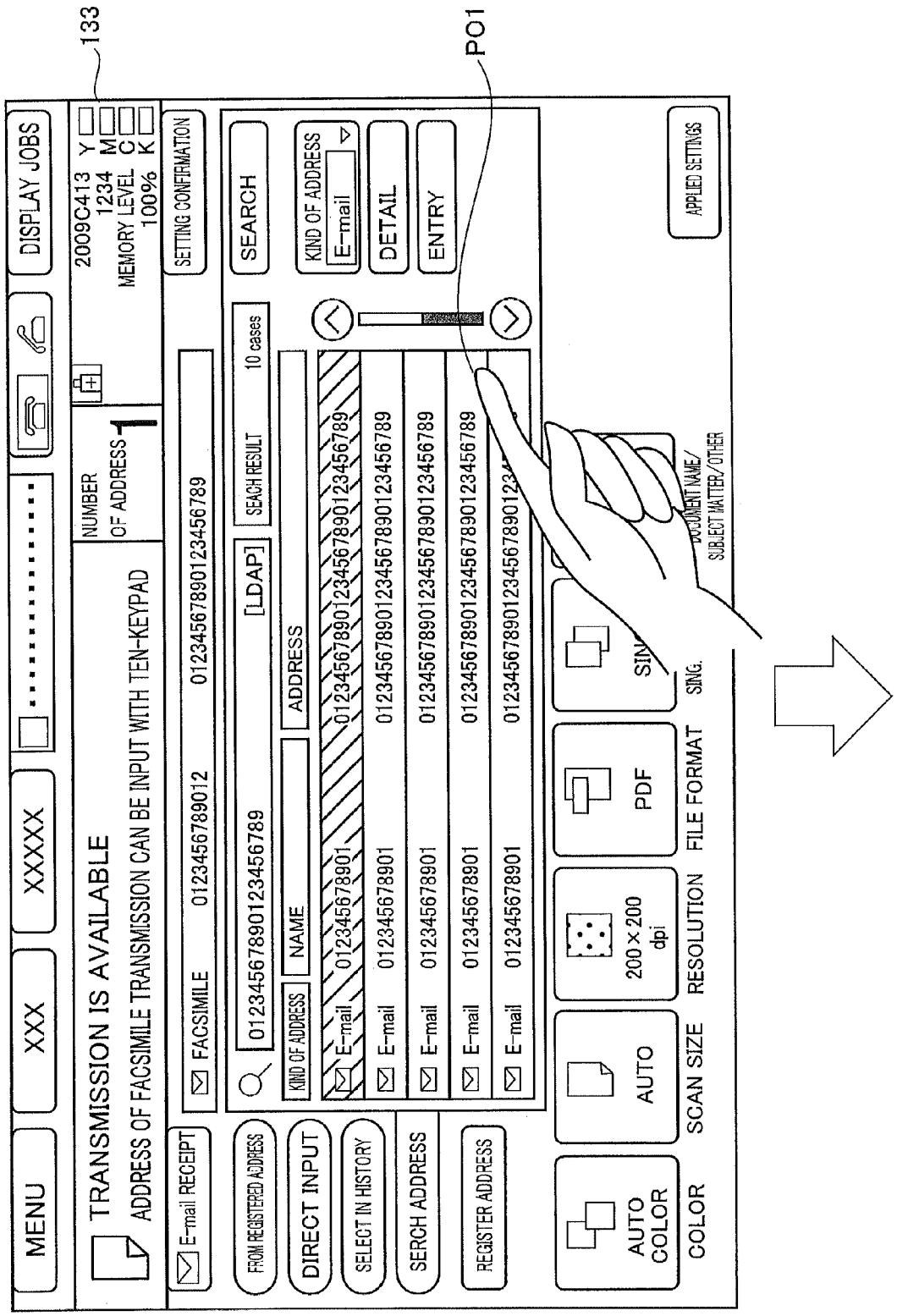
FIGS. 14(A) to 14(B) are a view schematically illustrating a first example of a transition of the screen displayed on display unit 133 by manipulation panel 130 when a warning message including the OK key is displayed.

Referring to FIG. 14(A), touch panel 134 detects the double tap, which is performed in a position PO1 by the user.

Figure 14B:
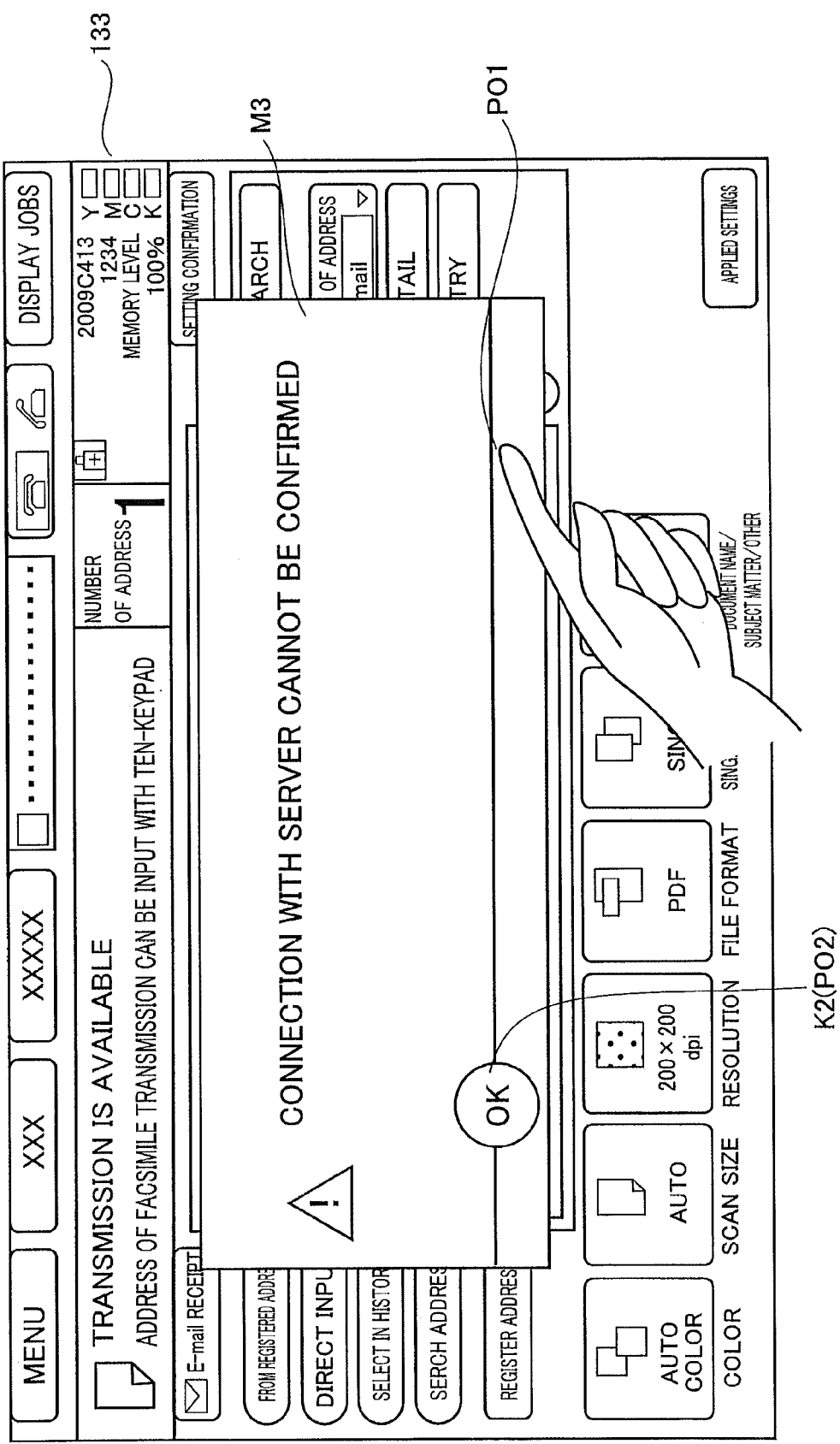

Referring to FIG. 14(B), after touch panel 134 detects the double tap, manipulation panel 130 displays a warning message M3 about the abnormal situation detected by abnormality detector 190 on display unit 133. Warning message M3 includes an OK key K2 for erasing the warning message M3.

In the case that the position where OK key K2 should be displayed overlaps position PO1, manipulation panel 130 displays OK key K2 in a position PO2 different from position PO1 where the double tap is received. Manipulation panel 130 may display OK key K2 at the same time as warning message M3 is displayed, or display OK key K2 anytime.

FIG. 15 is a view schematically illustrating a second example of the transition of the screen displayed on display unit 133 by manipulation panel 130 when the warning message including the OK key is displayed.

Figure 15A:
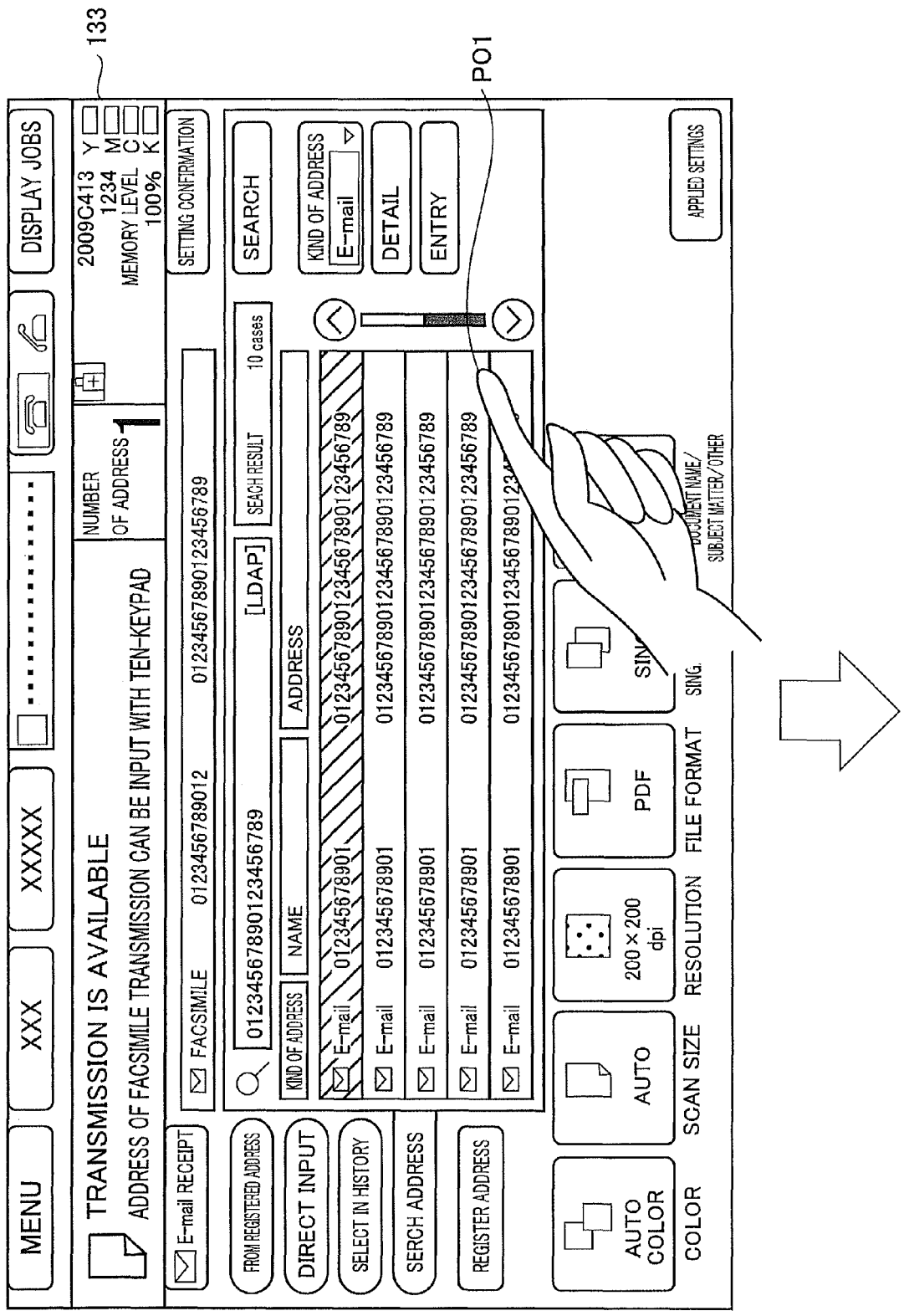
FIGS. 15(A) to 15(C) are a view schematically illustrating a second example of the transition of the screen displayed on display unit 133 by manipulation panel 130 when the warning message including the OK key is displayed.

Referring to FIG. 15(A), touch panel 134 detects the double tap, which is performed in position PO1 by the user.

Figure 15B:
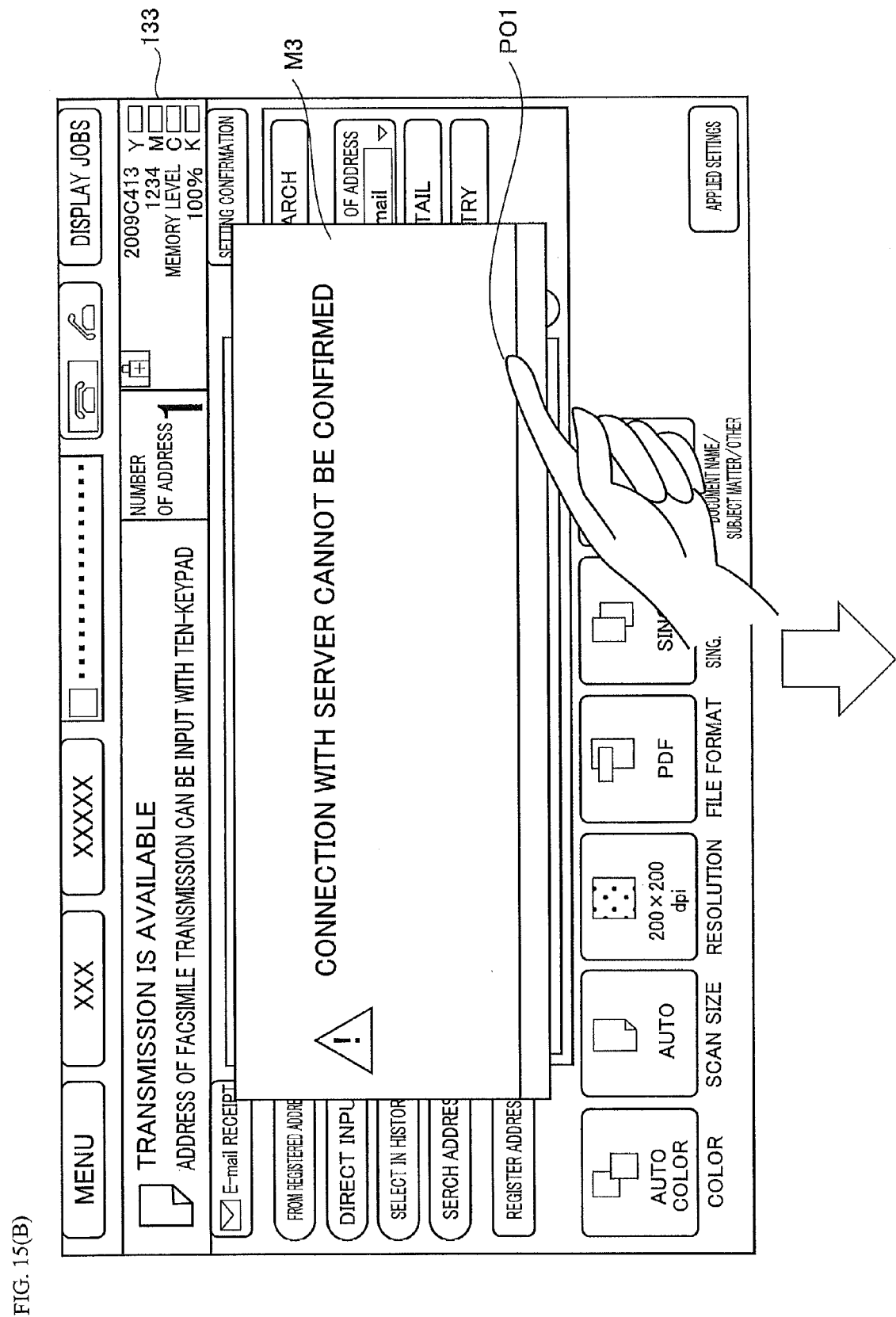

Referring to FIG. 15(B), in the case that the position where OK key K2 should be displayed overlaps position PO1, manipulation panel 130 displays, after touch panel 134 detects the double tap, warning message M3 about the abnormal situation detected by abnormality detector 190 on display unit 133. OK key K2 is not displayed yet at the time warning message M3 is displayed.

Figure 15C:
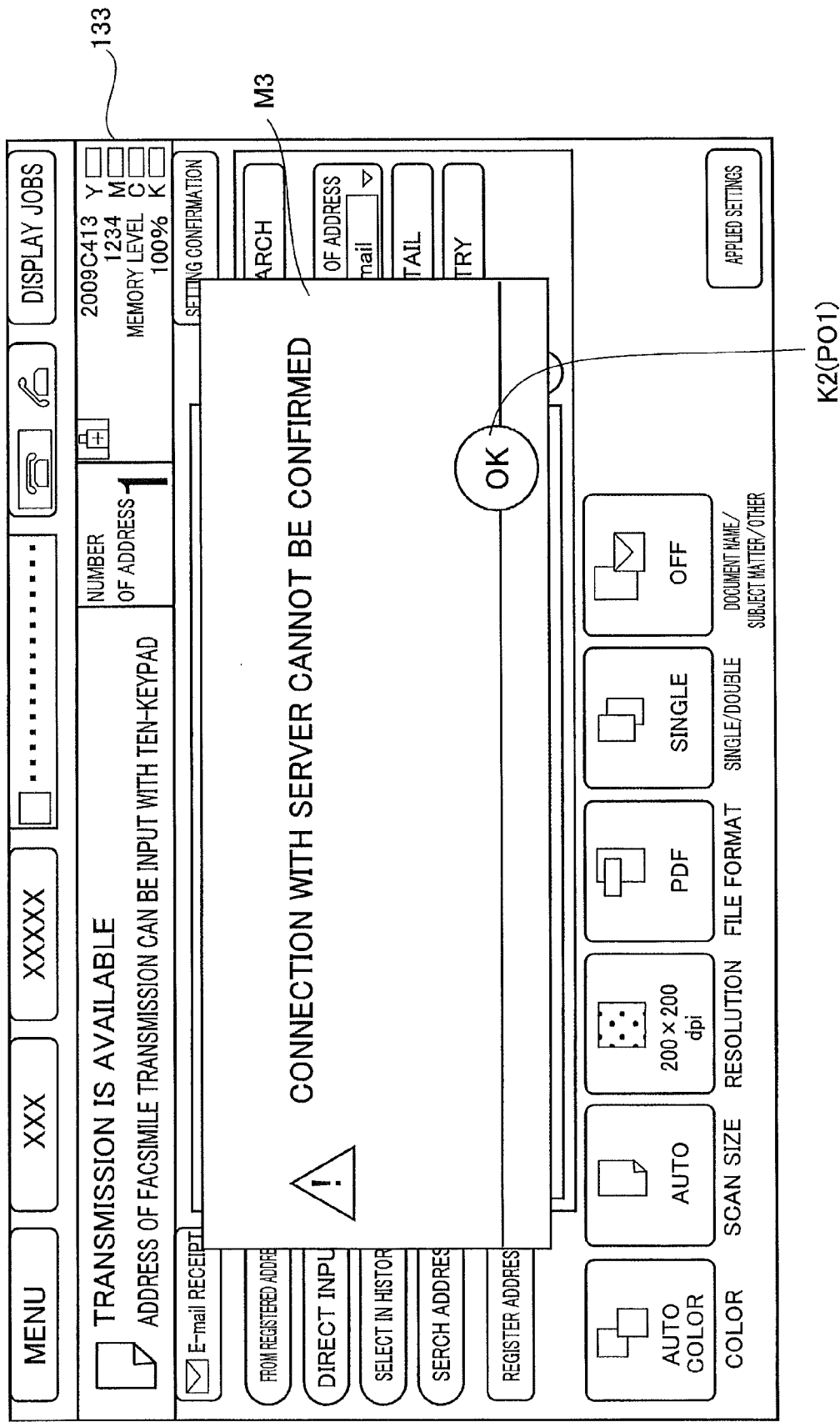

Referring to FIG. 15(C), manipulation panel 130 displays OK key K2 in order to erase warning message M3 at the time delayed compared with the time warning message M3 is displayed (after a certain period of time elapses since warning message M3 is displayed). Manipulation panel 130 may display OK key K2 in position PO1, or display OK key K2 anywhere.

OK key K2 is displayed by the method in FIGS. 14 and 15, which allows the user to be prevented from mistakenly pressing the OK key when the user performs the double tap.

Manipulation panel 130 may receive a setting adopting which one of the method in FIG. 14 and the method in FIG. 15 as the method for displaying OK key K2 (hereinafter sometimes referred to as a warning press button displaying setting) from the user. The setting may be stored as an initial setting of image forming apparatus 1 in fixed storage device 110.

Figure 16:
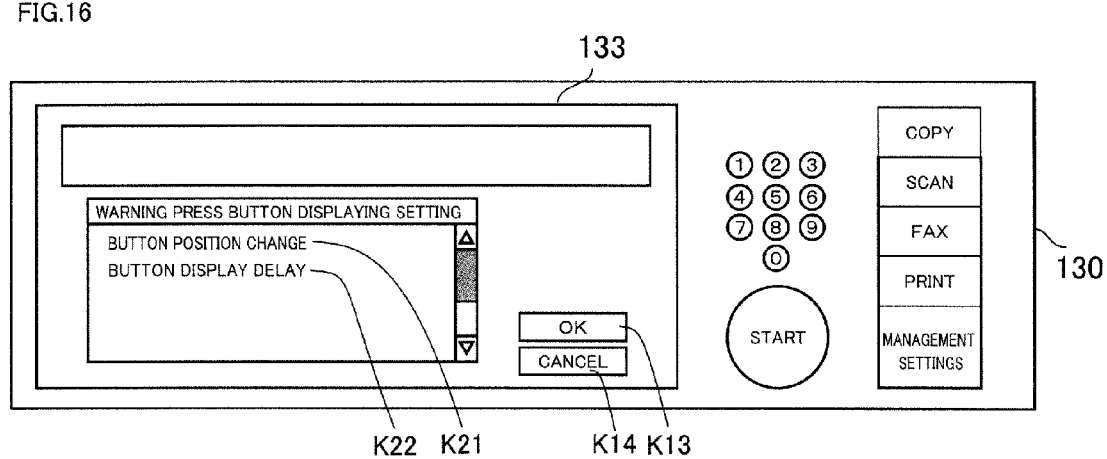
FIG. 16 is a view schematically illustrating a screen displayed on display unit 133 by manipulation panel 130 when a warning press button displaying setting is received from the user.
Figure 18A:
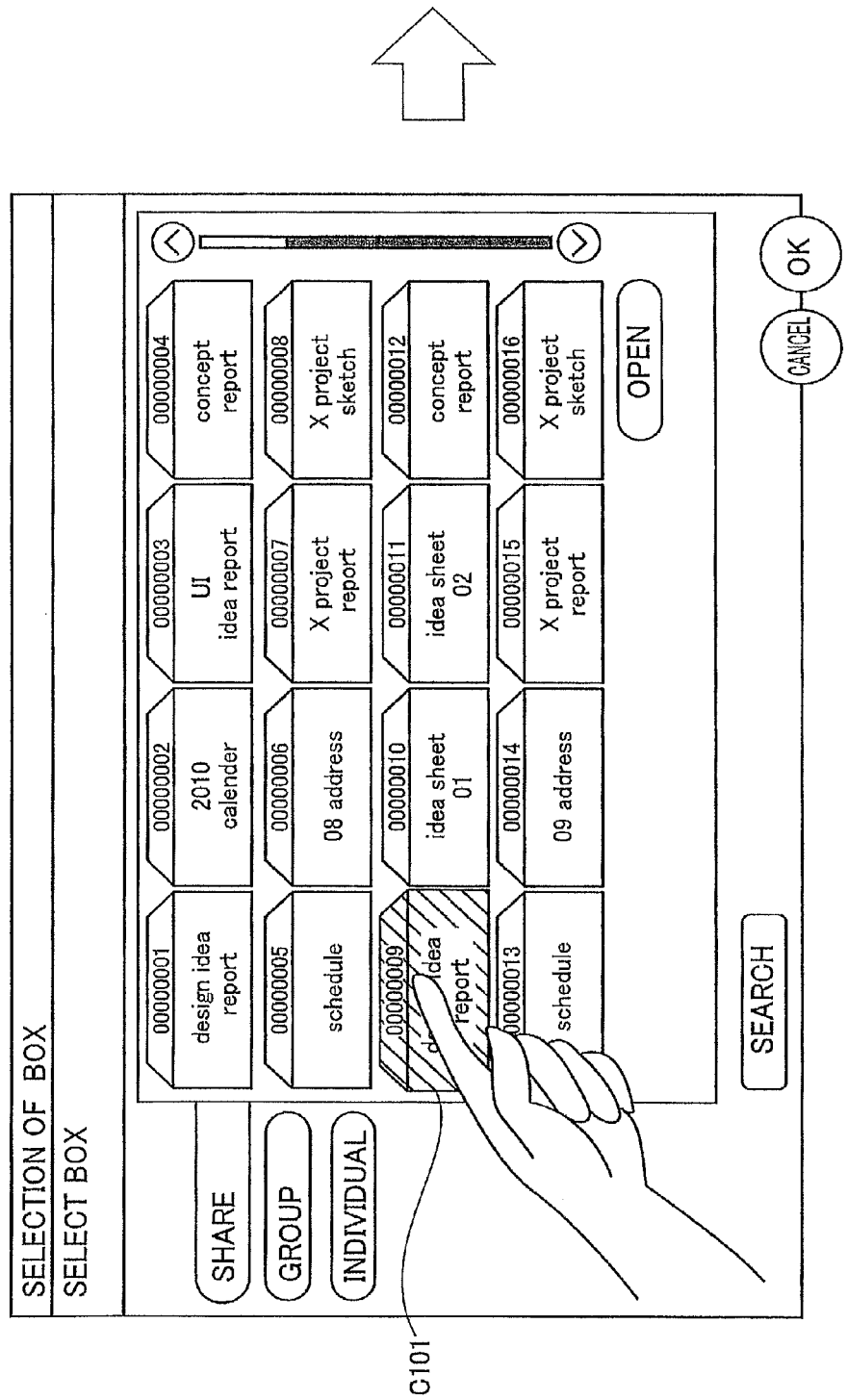
FIGS. 18(A) to 18(B) are a view schematically illustrating a transition of a screen displayed on a display unit when a touch panel detects double tap in the related art.
Figure 18B:
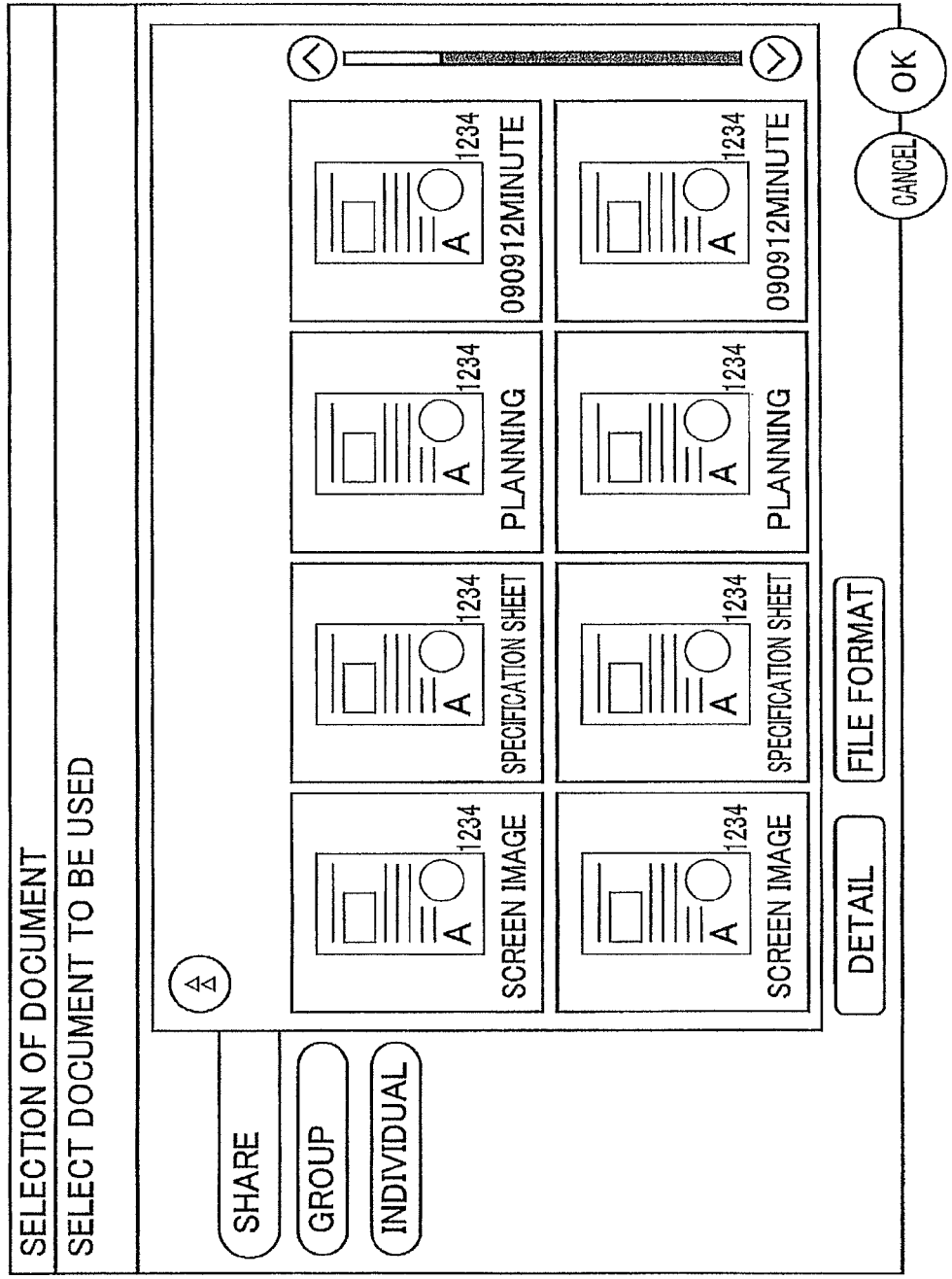
Figure 19A:
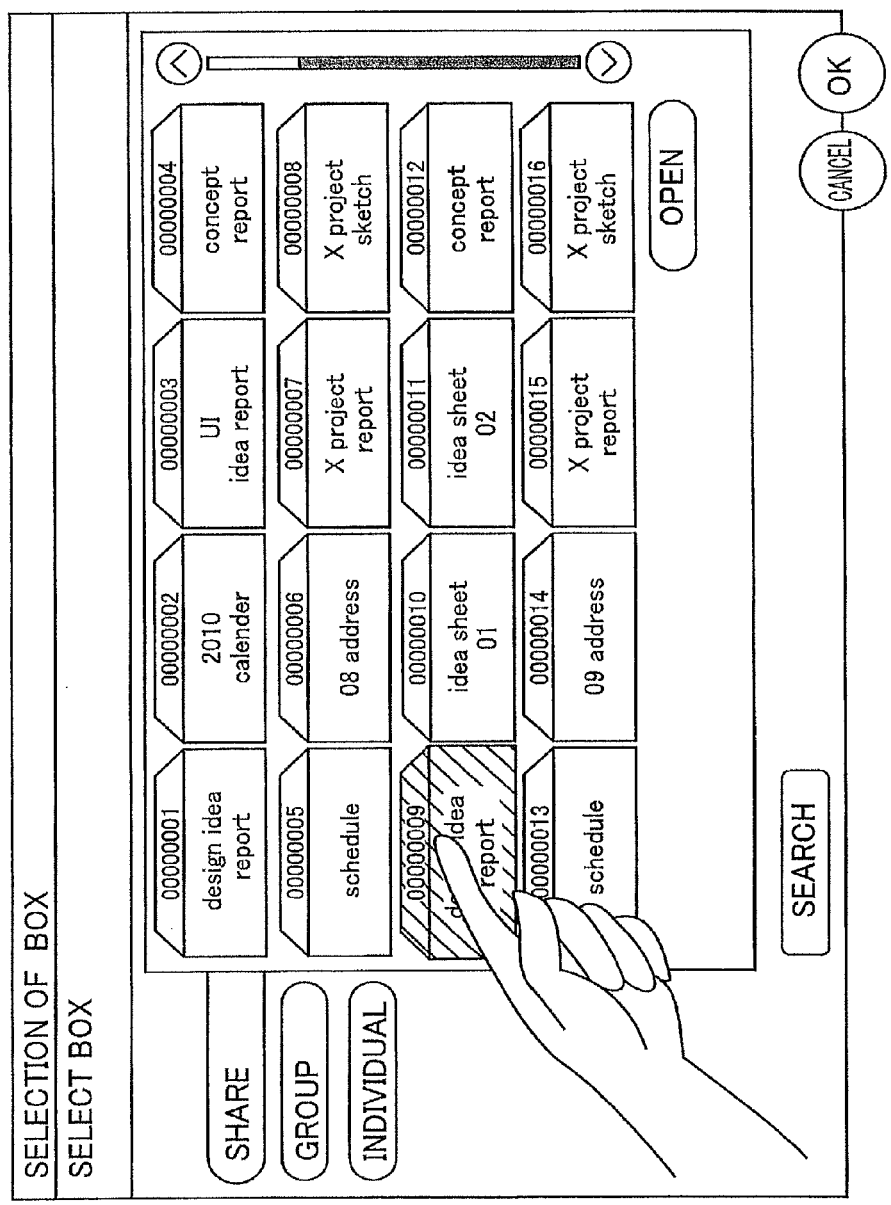
FIGS. 19(A) to 19(B) are a view schematically illustrating a transition of the screen displayed on the display unit when a message giving a warning about an abnormal situation of an image forming apparatus is displayed in the related art.
Figure 19B:
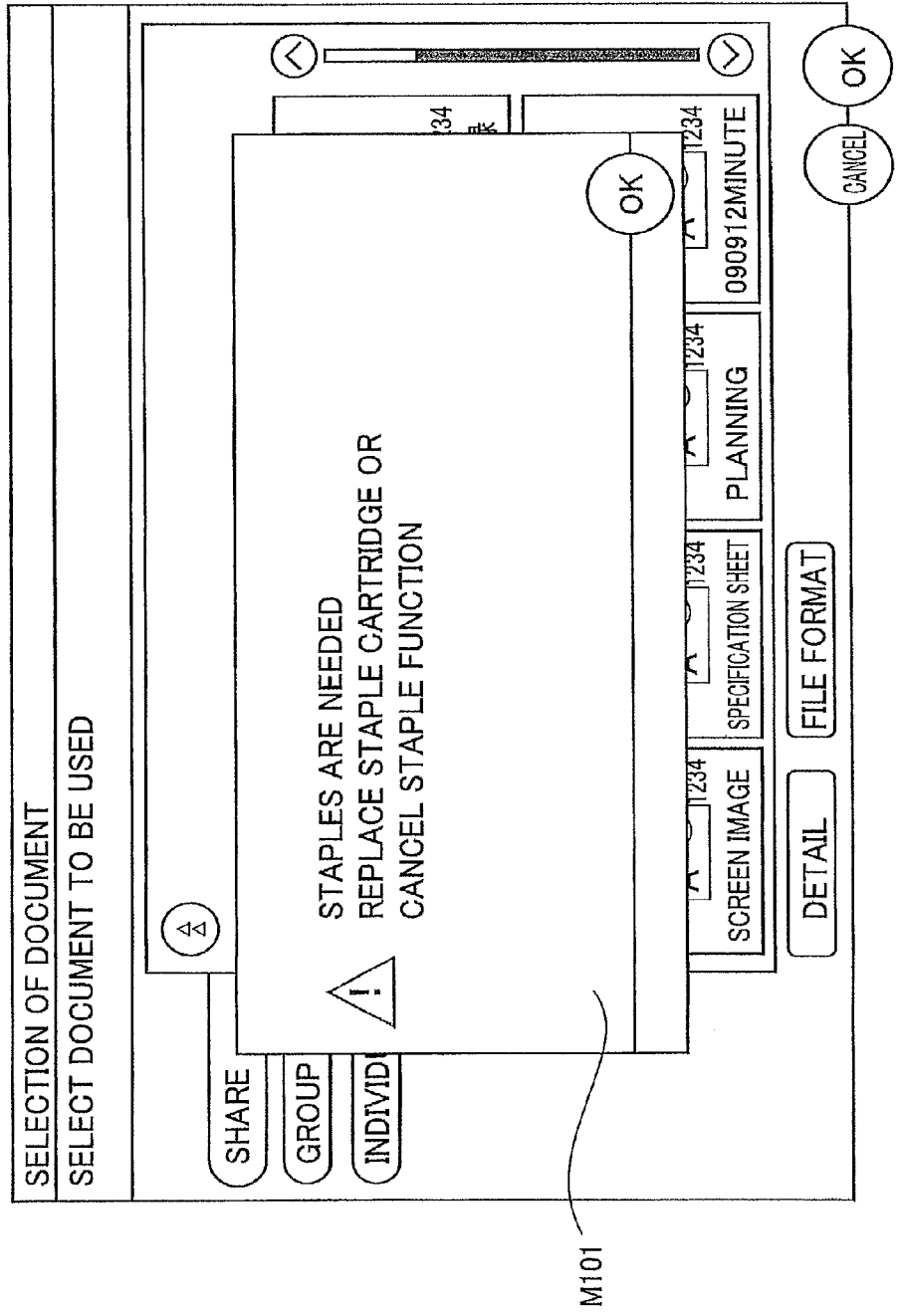

FIG. 16 is a view schematically illustrating a screen displayed on display unit 133 by manipulation panel 130 when a warning press button displaying setting is received from the user.

Referring to FIG. 16, when receiving the warning press button displaying setting from the user, manipulation panel 130 displays a button position changing key K21, a button display delaying key K22, an OK key K13, and a cancel key K14. When receiving button position changing key K21 selected by the user and OK key K13 pressed by the user, manipulation panel 130 sets the method for displaying OK key K2 to a method for changing a coordinate of OK key K2 (the method in FIG. 14). When receiving button display delaying key K22 selected by the user and OK key K13 pressed by the user, manipulation panel 130 sets the method for displaying OK key K2 to a method for delaying the display of OK key K2 (the method in FIG. 15). When receiving cancel key K14 pressed by the user, manipulation panel 130 terminates the key selection.

FIG. 17 is a flowchart illustrating the OK key displaying processing performed by manipulation panel 130.

Referring to FIG. 17, CPU 101 determines whether the OK key (button) for erasing the warning message is included in the warning message (S71). When the OK key is determined as included in the warning message in step S71 (Yes in S71), CPU 101 acquires the coordinate of the position where the double tap is detected (S75), and CPU 101 goes to processing in step S77. On the other hand, when the OK key is determined as not included in the warning message in step S71 (No in S71), CPU 101 ends the processing.

CPU 101 determines whether the position where the OK key should be displayed exists at the coordinate where the double tap is detected (S77). When the position where the OK key should be displayed is determined as existing at the coordinate where the double tap is detected in step S77 (Yes in S77), CPU 101 determines whether the OK key displaying method is set to the method for delaying the display of the OK key (S79).

When the OK key displaying method is determined as set to the method for delaying the display of the OK key in step S79 (Yes in S79), CPU 101 delays the key display (S81), and performs the processing of displaying the warning message (S83). Then CPU 101 ends the processing. On the other hand, when the OK key displaying method is determined as not set to the method for delaying the display of the OK key in step S79 (No in S79), CPU 101 changes the coordinate where the OK key is disposed (S85), and performs the processing of displaying the warning message (S83). Then CPU 101 ends the processing.

When the position where the OK key should be displayed is determined as not existing at the coordinate where the double tap is detected in step S77 (No in S77), CPU 101 performs the processing of displaying the warning message without changing the display method (S83). Then CPU 101 ends the processing.

ADVANTAGEOUS EFFECT

According to the embodiment, the user interface that improves the operability of the double tap can be provided.

According to the embodiment, the manipulation panel suppresses the display of the pop-up message on the display unit for the time until the next touch is recognized as the double tap since the user touches the touch panel (manipulation panel). The manipulation panel displays the pop-up message on the display unit after the user completes the manipulation of the double tap. Therefore, in the second tap, the user is prevented from mistakenly pressing the pop-up message, and the operability of the double tap can be improved.

As illustrated in FIG. 10, in the case that the processing of the double tap detected by the touch panel cannot be performed due to the abnormal situation detected by the abnormality detector, the warning message about the abnormal situation is displayed in priority to the performance of the processing of the double tap, so that the user can be notified that the processing of the double tap cannot be performed.

As illustrated in FIG. 11, in the case that the necessity to display the warning message about the abnormal situation detected by the abnormality detector is eliminated before the warning message is displayed, the display of the warning message is canceled, so that the display of the unnecessary warning message can be avoided.

[Others]

The above embodiment can properly be combined. For example, in the case that the priority warning is issued by the method in FIG. 10, the OK button may be displayed by the method in FIG. 14 or the method in FIG. 15. The OK button displaying methods in FIGS. 14 and 15 may be adopted in the case that the position of the OK key included in the warning message does not overlap the position where the double tap is performed.

The pieces of processing in the embodiment may be performed by software or a hardware circuit. A program executing the pieces of processing in the embodiment may be provided, or the program may be provided to the user while recorded in recording mediums, such as a CD-ROM, a flexible disk, a hard disk, a ROM, a RAM, and a memory card. The program is executed by computers, such as a CPU. The program may be downloaded to the apparatus through communication lines, such as the Internet.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A user interface device comprising:
a display unit for displaying a screen;
a tap detector for detecting a tap performed to said display unit;
a situation generation detector for detecting a situation; and
a first message display unit,
the first message display unit configured such that: when the situation generation detector detects the situation until the tap detector detects a second tap performed to the display unit since the tap detector detects a first tap performed to the display unit, the first message display unit suspends a displaying of a message about the situation on the display unit until the tap detector detects the second tap performed to the display unit, the first tap and the second tap constituting a double tap, and the first message display unit further configured such that when the tap detector detects the second tap within a predetermined time since the tap detector detects the first tap, the first message display unit displays the message about the situation detected by said situation generation detector on said display unit after said tap detector detects the second tap.

2. The user interface device according to claim 1, further comprising a second message display unit for displaying the message on said display unit when said tap detector does not detect the second tap within the predetermined time since said tap detector detects the first tap.

3. The user interface device according to claim 1, further comprising a screen transition unit for causing said display unit to transition to a screen associated with processing of the double tap when said tap detector detects the second tap, wherein said first message display unit displays the message about the situation detected by said situation generation detector on said display unit after said screen transition unit causes said display unit to transition to the screen associated with the processing of the double tap.

4. The user interface device according to claim 3, further comprising a priority setting receiving unit for receiving a setting giving a priority to which one of the transition of said display unit, which is performed by said screen transition unit, and the display of the message on said display unit by said first message display unit.

5. The user interface device according to claim 1, further comprising a message canceling unit for canceling the message displayed by said first message display unit when necessity to display the message about the situation detected by said situation generation detector is eliminated before said first message display unit displays the message.

6. The user interface device according to claim 1, wherein said first message display unit includes a priority display unit for displaying the message about the situation detected by said situation generation detector on said display unit in priority to a transition of said display unit to the screen associated with the processing of the double tap when the processing of the double tap cannot be performed due to the situation detected by said situation generation detector.

7. The user interface device according to claim 6, wherein said priority display unit includes:
a storing unit for storing a relationship between the situation detected by said situation generation detector and the processing of the double tap, which cannot be performed due to the situation detected by said situation generation detector; and
a determination unit for determining whether the processing of the double tap based on the second tap detected by said tap detector cannot be performed based on the relationship stored by said storing unit.

8. The user interface device according to claim 6, further comprising a double tap canceling unit for canceling the processing of the double tap when the message displayed by said priority display unit is erased from said display unit while the processing of the double tap based on the second tap detected by said tap detector cannot be performed.

9. The user interface device according to claim 1, wherein said first message display unit further display a key for erasing the message about the situation detected by said situation generation detector in a position different from a position where said tap detector receives the second tap.

10. The user interface device according to claim 1, wherein said first message display unit further display a key for erasing the message about the situation detected by said situation generation detector at a time delayed from a time the message about the situation detected by said situation generation detector is displayed.

11. The user interface device according to claim 1, wherein said first message display unit includes a key display setting receiving unit for receiving a setting adopting which one of a method for displaying a key for erasing the message about the situation detected by said situation generation detector in a position different from a position where said tap detector receives the second tap and a method for displaying the key at a time delayed from a time the message about the situation detected by said situation generation detector is displayed.

12. A method for controlling a user interface including a display unit for displaying a screen, comprising:
a tap detecting step detecting a first tap performed to said display unit;
a situation generation detecting step of detecting a situation; and
a first message displaying step comprising:
suspending a displaying of a message on the display unit until a second tap performed to the display unit is detected in the tap detecting step, when the situation is detected in the situation generation detecting step until the second tap performed to the display unit is detected since the first tap performed to the display unit is detected in the tap detecting step, the first tap and the second tap constituting a double tap, and
when the second tap is detected within a predetermined time since the first tap is detected, displaying the message about the situation detected in said situation generation detecting step on said display unit after the second tap is detected in said tap detecting step.

13. The user interface controlling method according to claim 12, further comprising a second message displaying step of displaying the message about the situation detected in said situation generation detecting step on said display unit when the second tap is not detected in said tap detecting step within the predetermined time since the first tap is detected in said tap detecting step.

14. The user interface controlling method according to claim 12, further comprising a screen transition step of causing said display unit to transition to a screen associated with processing of the double tap when the second tap is detected in said tap detecting step, wherein the message about the situation detected in said situation generation detecting step is displayed on said display unit in said first message displaying step after transition of said display unit in said screen transition step.

15. A non-transitory computer-readable recording medium storing a control program for a user interface,
said user interface including a display unit for displaying a screen,
said control program causing a computer to execute processing comprising:
a tap detecting step detecting a first tap performed to said display unit;
a situation generation detecting step of detecting a situation; and
a first message displaying step comprising:
suspending a displaying of a message on the display unit until a second tap performed to the display unit is detected in the tap detecting step, when the situation is detected in the situation generation detecting step until the second tap performed to the display unit is detected since the first tap performed to the display unit is detected in the tap detecting step, the first tap and the second tap constituting a double tap, and when the second tap is detected within a predetermined time since the first tap is detected, displaying the message about the situation detected in said situation generation detecting step on said display unit after the second tap is detected in said tap detecting step.

16. The recording medium according to claim 15, wherein said control program further causes the computer to execute processing comprising a second message displaying step of displaying the message about the situation detected in said situation generation detecting step on said display unit when the second tap is not detected in said tap detecting step within the predetermined time since the first tap is detected in said tap detecting step.

17. The recording medium according to claim 15, wherein said control program further causes the computer to execute processing comprising a screen transition step of causing said display unit to transition to a screen associated with processing of the double tap when the second tap is detected in said tap detecting step, wherein the message about the situation detected in said situation generation detecting step is displayed on said display unit in said first message displaying step after transition of said display unit in said screen transition step.

18. The user interface controlling method according to claim 14, further comprising a priority setting receiving step of receiving a setting giving a priority to which one of the transition of said display unit in said screen transition step, and the display of the message on said display unit in said first message displaying step.

19. The user interface controlling method according to claim 12, further comprising a message canceling step of canceling the message displayed in said first message displaying step when necessity to display the message about the situation detected in said situation generation detecting step is eliminated before the message is displayed by said first message displaying step.

20. The user interface controlling method according to claim 12, wherein said first message displaying step includes a priority displaying step of displaying the message about the situation detected in said situation generation detecting step on said display unit in priority to a transition of said display unit to the screen associated with the processing of the double tap when the processing of the double tap cannot be performed due to the situation detected in said situation generation detecting step.

21. The user interface controlling method according to claim 20, wherein said priority displaying step includes:

a storing step of storing a relationship between the situation detected in said situation generation detecting step and the processing of the double tap, which cannot be performed due to the situation detected in said situation generation detecting step; and a determination step of determining whether the processing of the double tap based on the second tap detected in said tap detecting step cannot be performed based on the relationship stored in said storing step.

22. The user interface controlling method according to claim 20, further comprising a double tap canceling step of canceling the processing of the double tap when the message displayed by said priority display unit is erased from said display unit while the processing of the double tap based on the second tap detected in said tap detecting step cannot be performed.

23. The user interface controlling method according to claim 12, wherein said first message displaying step further includes displaying a key for erasing the message about the situation detected in said situation generation detecting step in a position different from a position where the second tap is received in said tap detecting step.

24. The user interface controlling method according to claim 12, wherein said first message displaying step further includes displaying a key for erasing the message about the situation detected in said situation generation detecting step at a time delayed from a time the message about the situation detected in said situation generation detecting step is displayed.

25. The user interface controlling method according to claim 12, wherein said first message displaying step includes a key display setting receiving step of receiving a setting adopting which one of a method for displaying a key for erasing the message about the situation detected in said situation generation detecting step in a position different from a position where the second tap is received in said tap detecting step and a method for displaying the key at a time delayed from a time the message about the situation detected in said situation generation detecting step is displayed.

26. The recording medium according to claim 17, further comprising a priority setting receiving step of receiving a setting giving a priority to which one of the transition of said display unit in said screen transition step, and the display of the message on said display unit in said first message displaying step.

27. The recording medium according to claim 15, further comprising a message canceling step of canceling the message displayed in said first message displaying step when necessity to display the message about the situation detected in said situation generation detecting step is eliminated before the message is displayed by said first message displaying step.

28. The recording medium according to claim 15, wherein said first message displaying step includes a priority displaying step of displaying the message about the situation detected in said situation generation detecting step on said display unit in priority to a transition of said display unit to the screen associated with the processing of the double tap when the processing of the double tap cannot be performed due to the situation detected in said situation generation detecting step.

29. The recording medium according to claim 28, wherein said priority displaying step includes:

a storing step of storing a relationship between the situation detected in said situation generation detecting step and the processing of the double tap, which cannot be performed due to the situation detected in said situation generation detecting step; and a determination step of determining whether the processing of the double tap based on the second tap detected in said tap detecting step cannot be performed based on the relationship stored in said storing step.

30. The recording medium according to claim 28, further comprising a double tap canceling step of canceling the processing of the double tap when the message displayed by said priority display unit is erased from said display unit while the processing of the double tap based on the second tap detected in said tap detecting step cannot be performed.

31. The recording medium according to claim 15, wherein said first message displaying step further includes displaying a key for erasing the message about the situation detected in said situation generation detecting step in a position different from a position where the second tap is received in said tap detecting step.

32. The recording medium according to claim 15, wherein said first message displaying step further includes displaying a key for erasing the message about the situation detected in said situation generation detecting step at a time delayed from a time the message about the situation detected in said situation generation detecting step is displayed.

33. The recording medium according to claim 15, wherein said first message displaying step includes a key display setting receiving step of receiving a setting adopting which one of a method for displaying a key for erasing the message about the situation detected in said situation generation detecting step in a position different from a position where the second tap is received in said tap detecting step and a method for displaying the key at a time delayed from a time the message about the situation detected in said situation generation detecting step is displayed.

* * * * *